United States Patent
Goman et al.

(10) Patent No.: US 7,303,368 B2
(45) Date of Patent: Dec. 4, 2007

(54) TRAILER FOR WALK GREENSMOWER

(75) Inventors: Gerald E. Goman, Spring Valley, WI (US); Robert D. Patton, New Prague, MN (US); John E. Close, Big Lake, MN (US); Christopher C. Dickey, West St. Paul, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/402,384

(22) Filed: Mar. 28, 2003

(65) Prior Publication Data

US 2004/0191041 A1    Sep. 30, 2004

(51) Int. Cl.
*B60P 1/04* (2006.01)

(52) U.S. Cl. .............. 414/485; 414/469; 414/483; 414/537; 410/3

(58) Field of Classification Search .......... 414/482, 414/483, 485, 469, 537; 410/3; 238/14.3, 238/14.6
See application file for complete search history.

(56) References Cited

U.S. PATENT DOCUMENTS

| | | | | | |
|---|---|---|---|---|---|
| 245,876 | A | * | 8/1881 | Morcheles | 238/13 |
| 2,274,487 | A | * | 2/1942 | Krenzke | 414/537 |
| 3,774,547 | A | * | 11/1973 | Widiger et al. | 104/244 |
| 4,467,924 | A | * | 8/1984 | Morcheles | 211/1.57 |
| 5,145,308 | A | * | 9/1992 | Vaughn et al. | 414/462 |
| 5,342,162 | A | * | 8/1994 | Robinette et al. | 414/483 |
| 5,503,449 | A | * | 4/1996 | Cameron et al. | 296/39.1 |
| 5,711,227 | A | * | 1/1998 | Johnson | 104/126 |
| 6,019,566 | A | * | 2/2000 | Thier et al. | 414/537 |
| 6,485,246 | B1 | * | 11/2002 | Harkcom et al. | 414/537 |
| 6,695,564 | B2 | * | 2/2004 | Pfisterer | 414/485 |

OTHER PUBLICATIONS

Giant Vac Greens Mower Caddy brochure, published before Mar. 28, 2002.
Greens Wagon brochure, published before Mar. 28, 2002.
Textron 2001 Show Guide page showing Textron Mowercaddy, dated 2001.
Toro Trans Pro 100 Installation Instructions, dated 1998.
Toro Trans Pro 100 High Ramp Conversion Kit Parts Catalog, dated 1998.
Toro Trans Pro 100 brochure, dated 1999.

* cited by examiner

*Primary Examiner*—Saul Rodriguez
*Assistant Examiner*—M. S Lowe
(74) *Attorney, Agent, or Firm*—James W. Miller

(57) ABSTRACT

A trailer for a walk greensmower comprises a trailer frame supported by a pair of ground engaging trailer wheels. The trailer frame includes a pair of spaced, parallel wheel ramps. A tongue is provided for connecting to a tow vehicle. The trailer frame is pivotal relative to the tongue and to the trailer wheels to tilt into an inclined loading position for loading the walk greensmower by driving the walk greensmower up the wheel ramps using the powered transport wheels of the walk greensmower. Once the walk greensmower is loaded onto the wheel ramps, the trailer frame is pivoted into a transport position in which the wheel ramps no longer engage the ground and the walk greensmower is carried on the wheel ramps. In one embodiment of this trailer, the wheel ramps comprise cylindrical rails and the transport wheels are grooved to ride on the top sides of the rails.

15 Claims, 18 Drawing Sheets

TRAILER FOR WALK GREENSMOWER

TECHNICAL FIELD

This invention relates to a trailer for moving a wheeled object from one place to another. More particularly, this invention relates to a trailer for moving a walk behind outdoor maintenance unit, such as a walk greensmower, from one place to another.

BACKGROUND OF THE INVENTION

In the turf maintenance field, walk greensmowers are known for the close cutting of grass on golf greens. Such greensmowers are often carried from place to place by various types of trailers. For example, after cutting the grass on one or two greens of a golf course, it is often necessary to transport the greensmower back to the maintenance shed or to another distant part of the golf course. Due to the low ground speed of a walk greensmower, small trailers towed by utility vehicles are often used to carry the greensmower from one place to another.

The trailers normally used to transport greensmowers are fairly conventional in configuration. Such trailers have a trailer box including a horizontal floor or bed. The box includes a pivotal endgate which may be lowered to allow the greensmower to be driven up the endgate and into the box of the trailer. The endgate is raised after the trailer is loaded.

Known trailers for transporting greensmowers are unduly complicated. The horizontal bed or floor of the trailer box is of substantial extent. The trailer box also often includes a front wall and opposed side walls as well as the pivotal endgate. Thus, considerable material costs and extensive labor are involved in building such a trailer. Accordingly, such trailers can be expensive to produce and thus expensive to purchase. There is a need for a simpler, less expensive trailer.

SUMMARY OF THE INVENTION

One aspect of this invention relates to a trailer for carrying a wheeled object from place to place. The wheeled object has a pair of transport wheels. The trailer comprises a trailer frame having a pair of wheel ramps which terminate in free outer ends. A pair of ground engaging trailer wheels are rotatably carried on the trailer frame to permit the trailer frame to roll over the ground. A tongue that carries a portion of a tow hitch thereon is connected to the trailer frame. The trailer frame is pivotal relative to the tongue and the trailer wheels to permit the trailer frame to pivot between a first loading position in which the free outer ends of the wheel ramps engage the ground to permit the wheeled object to be loaded onto the trailer frame and a second transport position in which the free outer ends of the wheel ramps are raised out of engagement with the ground.

Another aspect of this invention relates to trailer for carrying a wheeled object from one place to another place. The trailer comprises a trailer frame comprising a transverse crossmember, a pair of parallel wheel ramps extending rearwardly from the crossmember, a central arm extending forwardly from the crossmember, and a pair of wheel mounts carried on opposite ends of the crossmember. A pair of ground engaging wheels are rotatably journaled in the wheel mounts with one wheel being journaled in one wheel mount and the other wheel being journaled in the other wheel mount. A tongue is pivotally connected to the central arm of the crossmember for connecting the trailer frame to a tow vehicle.

Yet another aspect of this invention relates to a trailer for carrying a walk greensmower from one place to another place. The walk greensmower has a frame, a pair of rotatable transport wheels, a reel type cutting unit carried on a front of the frame, and a handle assembly extending upwardly and rearwardly from the frame to allow an operator to walk behind the greensmower while the greensmower is cutting grass. The trailer comprises a trailer frame supported for rolling over the ground by a pair of ground engaging trailer wheels. The trailer frame comprises a rearward portion having two parallel, spaced apart wheel ramps located apart a distance equal to the distance between the transport wheels of the walk greensmower. The trailer frame is pivotal between an inclined loading position in which rear ends of the wheel ramps engage against the ground and a substantially horizontal transport position in which the rear ends of the wheel ramps are pivoted up out of engagement with the ground. The transport wheels of the walk greensmower remain on the wheel ramps when the trailer frame is in the transport position.

Another aspect of this invention relates to a trailer for carrying a walk greensmower having a pair of transport wheels. Each transport wheel of the walk greensmower has an outer rim with a concave groove. The trailer comprises a trailer frame carrying a pair of cylindrical rails. At least a portion of the rails are pivotal such that free outer ends of the rails can be lowered into a loading position adjacent the ground or can be raised into a transport position above the ground. The concave groove in the transport wheels of the walk greensmower is shaped to ride on a top side of the cylindrical rails as the walk greensmower is loaded into or removed from the trailer.

BRIEF DESCRIPTION OF THE DRAWING

This invention will be described hereafter in the Detailed Description, taken in conjunction with the following drawings, in which like reference numerals refer to like elements or parts throughout.

DETAILED DESCRIPTION

A trailer according to a first embodiment of the invention is illustrated generally as 2 in FIGS. 1-7. Trailer 2 is particularly suited for carrying a walk greensmower 4 thereon, but is not limited to this use. Other walk behind outdoor maintenance units, such as walk behind snowthrowers, tillers, wheelbarrows, or the like, may be carried by trailer 2. In fact, trailer 2 may be used to carry other small, wheeled objects even when such objects are outside the outdoor maintenance art. Trailer 2 is most useful for carrying objects supported by a single pair of ground engaging wheels comprising a left wheel and a right wheel.

Trailer 2 as shown in FIGS. 1-7 is a bedless trailer in that it has no horizontal floor or bed underlying walk greensmower 4. Thus, trailer 2 incorporates a minimum of material and components to decrease its costs and complexity. Nonetheless, trailer 2 is easy to load and use and provides a stable base for transporting a wheeled object, such as a walk greensmower 4. As will be described in more detail hereafter, trailer 2 also doubles as a work stand to allow the user to more easily service walk greensmower 4.

Figure 1:
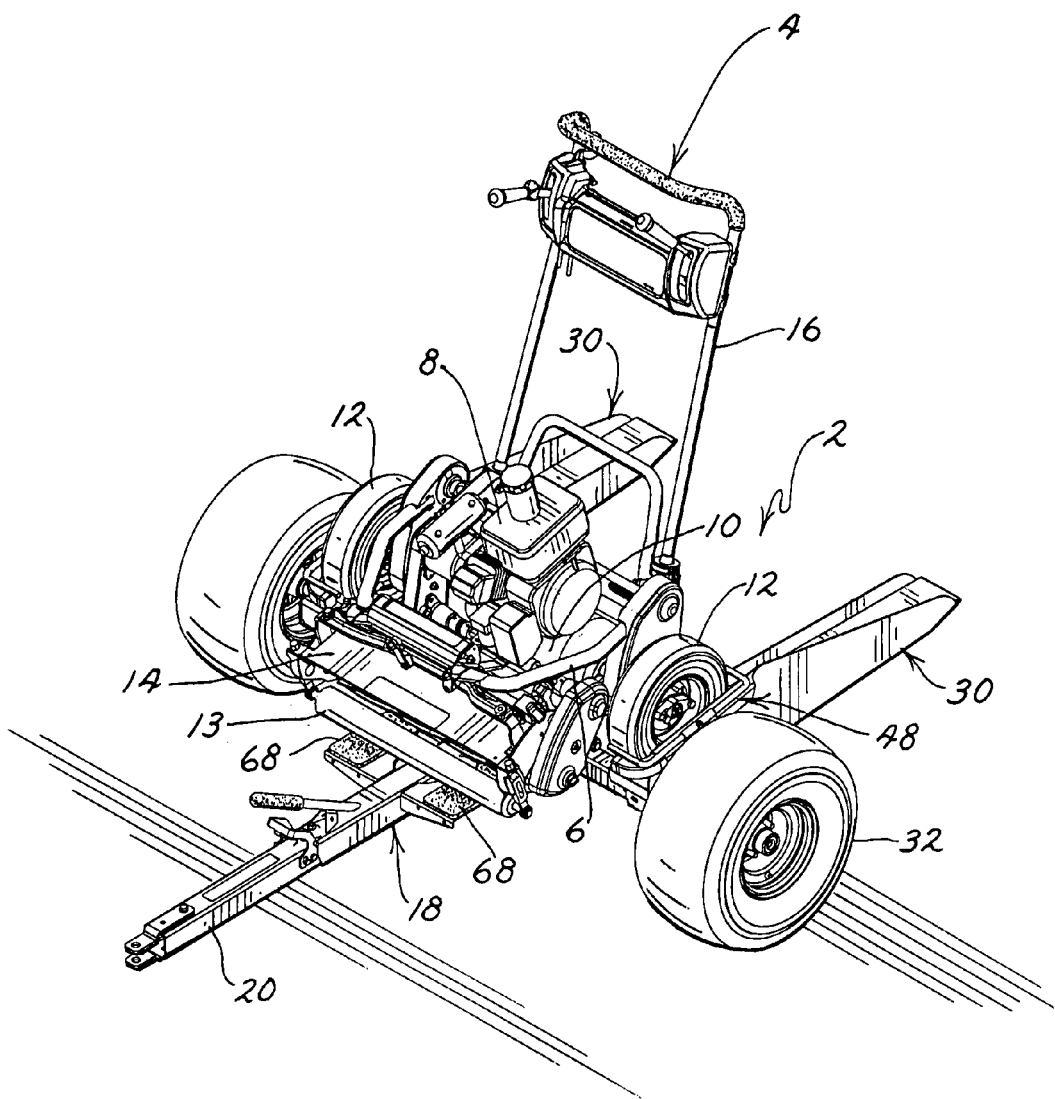
FIG. 1 is a perspective view of a first embodiment of a trailer according to this invention, particularly illustrating a loaded trailer carrying a walk greensmower.

Before trailer 2 is described in detail, a brief background description of walk greensmower 4 will be provided. Referring to FIG. 1, walk greensmower 4 includes a frame 6 that mounts a prime mover 8 such as an internal combustion engine. A traction drum 10 is located at the rear of frame 6 for propelling walk greensmower 4 while walk greensmower 4 is cutting grass. A pair of transport wheels 12 are optionally mounted on extended portions of the axle of traction drum 10 with transport wheels 12 being in place when walk greensmower 4 is being transported but usually being removed when walk greensmower 4 is used to cut grass. Some walk greensmowers have only transport wheels 12 and no traction drum 10.

A reel type cutting unit 14 is carried on the front of walk greensmower frame 6 for close cutting of grass. A handle assembly 16 extends upwardly and rearwardly from walk greensmower frame 6 to permit an operator to walk behind walk greensmower 4 to operate and guide walk greensmower 4. Walk greensmower 4 has a forward weight distribution such that the center of mass of walk greensmower 4 lies forwardly of the line of contact of traction drum 10 and/or transport wheels 12 with the ground. Thus, when walk greensmower 4 is located on relatively flat ground, the forward weight distribution of walk greensmower 4 causes cutting unit 14 to be biased down into engagement with the ground. The operator can push down on handle assembly 16 to lift cutting unit 14 up off the ground, such as at the end of a cutting pass prior to the operator turning walk greensmower 4 around.

The Embodiment of FIGS. 1-7

Figure 4:
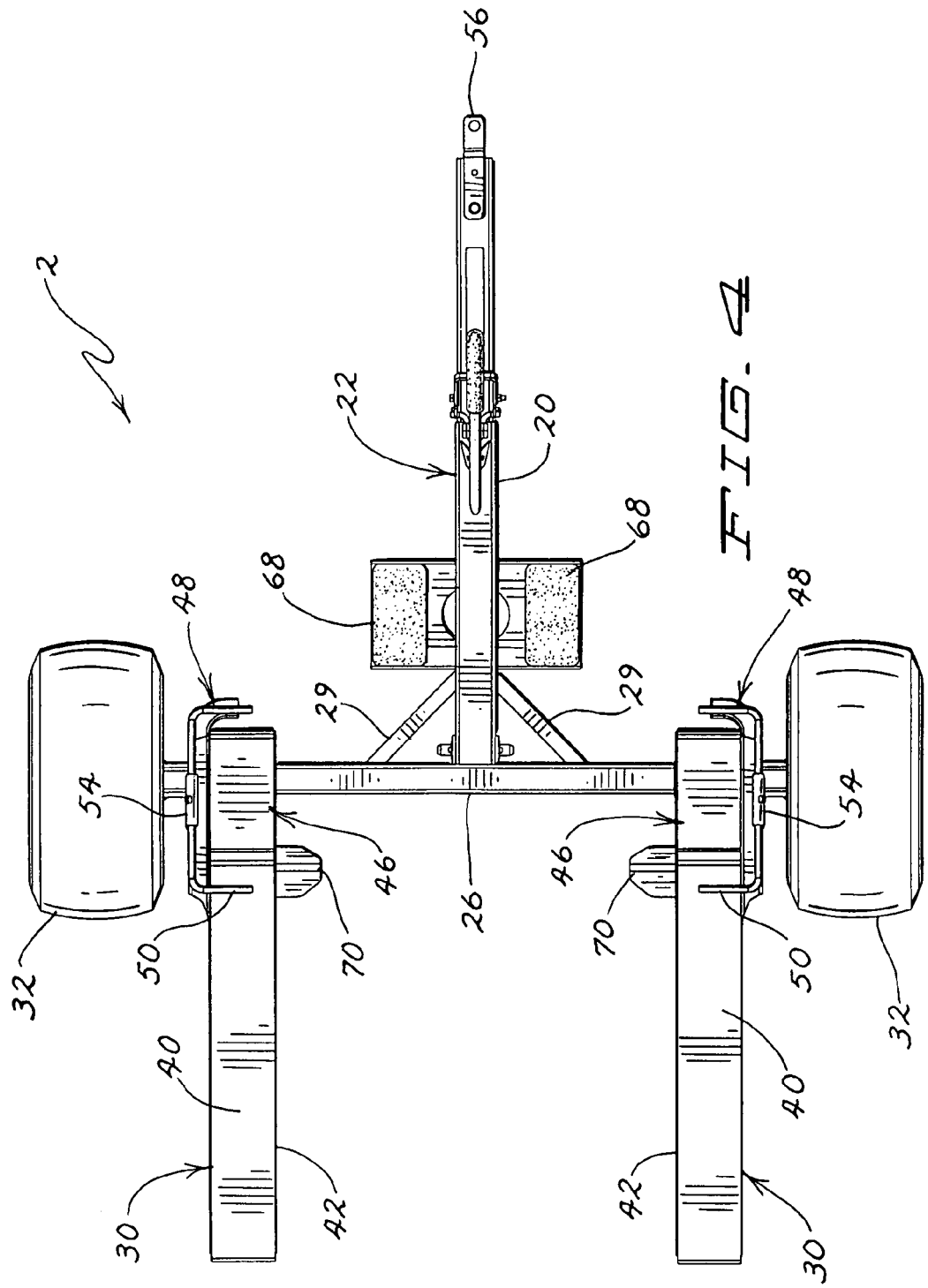
FIG. 4 is a top plan view of the trailer of FIG. 1.

Trailer 2 includes a trailer frame 18 pivotally connected to a tongue 20. Trailer frame 18 has a substantially T-shaped forward portion 22 and a substantially U-shaped rearward portion 24, as best shown in FIG. 4. T-shaped forward portion 22 is formed by a transverse tubular crossmember 26 having a central longitudinal arm 28 fixed thereto. The rear of arm 28 may be welded or otherwise suitably affixed to the front of crossmember 26. Stiffening braces 29 can also be used between the sides of arm 28 and crossmember 26 to further support and affix arm 28 to crossmember 26. Arm 28 comprises a U-shaped downwardly facing channel.

U-shaped rearward portion 24 of trailer frame 18 is formed by transverse crossmember 26 and a pair of spaced, parallel, rearwardly extending wheel ramps 30. Wheel ramps 30 may be bolted or otherwise suitably affixed to the top of crossmember 26. While a single common crossmember 26 is used as part of T-shaped forward portion 22 and U-shaped rearward portion 24 of trailer frame 18, each portion 22 and 24 could have its own crossmember with crossmembers 26 connected to each other as part of a box or H-shaped frame. Regardless of how trailer frame 18 is constructed, forward and rearward portions 22 and 24 of trailer frame 18 are fixed together to move as a single unit.

A pair of rotatable ground engaging trailer wheels 32, namely a left trailer wheel and a right trailer wheel, are rotatably journaled on trailer frame 18 by a pair of wheel mounts 34 carried on opposite ends of crossmember 26. Wheel mounts 34 are mostly hidden in FIGS. 1-4 by wheel ramps 30, but similar wheel mounts 34 are shown in the embodiment of FIGS. 8-17. Thus, reference will also be made to FIGS. 8-17 to illustrate the same wheel mounts 34 used in the embodiment of FIGS. 1-7.

Each wheel mount 34 comprises a downwardly facing U-shaped channel 35 on which a stub axle 36 is carried. Channel 35 is adapted to drop down over crossmember 26 to be rigidly secured thereto by the same bolts 43 used to affix wheel ramps 30 to crossmember 26. When wheel mount 34 is so secured, the stub axle 36 on each wheel mount 34 extends transversely outwardly past the end of crossmember 26. Each trailer wheel 32 has a hub 38 rotatably journaled on stub axle 36. Thus, in the embodiment of FIGS. 1-7, a stub axle 36 is used on the top of each end of crossmember 26 to rotatably journal the two trailer wheels 32.

Each wheel ramp 30 of trailer frame 18 comprises an upwardly facing channel having a bottom wall 40 and spaced inner and outer side walls 42 and 44. Outer side wall 44 of wheel ramp 30 is higher than inner side wall 42, but side walls 42 and 44 could have the same height or one or both of the side walls 42 and 44 could be deleted. Bottom wall 40 of wheel ramp 30 has a wheel receiving recess 46 at the top end of wheel ramp 30. Wheel receiving recess 46 is sized to receive the bottom portion of one of the transport wheels 12 of walk greensmower 4.

Each wheel ramp 30 also includes a downwardly facing U-shaped channel 41 that is adapted to drop down over crossmember 26. A pair of attachment bolts 43 pass through channel 41 and through channel 35 of a wheel mount 34 to simultaneously bolt or rigidly fix both a wheel mount 34 and a wheel ramp 30 to each end of crossmember 26. In this respect, channel 41 of wheel ramp 30 and channel 35 of wheel mount 34 nest together as they are received around crossmember 26. Each channel 35 and 41 has pairs of holes in the opposite side walls of the channels to allow attachment bolts 43 to pass therethrough.

Walk greensmowers 4 typically come in different widths. The assignee of this invention, The Toro Company, makes walk greensmowers having 18", 21" and 26" cutting widths. Preferably, each end of crossmember 26 has a plurality of sets of holes 45, with one hole 45 being shown in FIG. 2, for allowing the wheel ramp 30 and the wheel mount 36 to be bolted to crossmember 26 at different positions to thereby adjust the width between the wheel ramps 30 to accommodate these differently sized walk greensmowers 4. Thus, depending upon which set of holes 45 on each end of crossmember 26 receives bolts 43, wheel ramps 30 will be laterally spaced apart at a particular width designed to receive either an 18", 21" or 26" walk greensmower 4.

Figure 2:
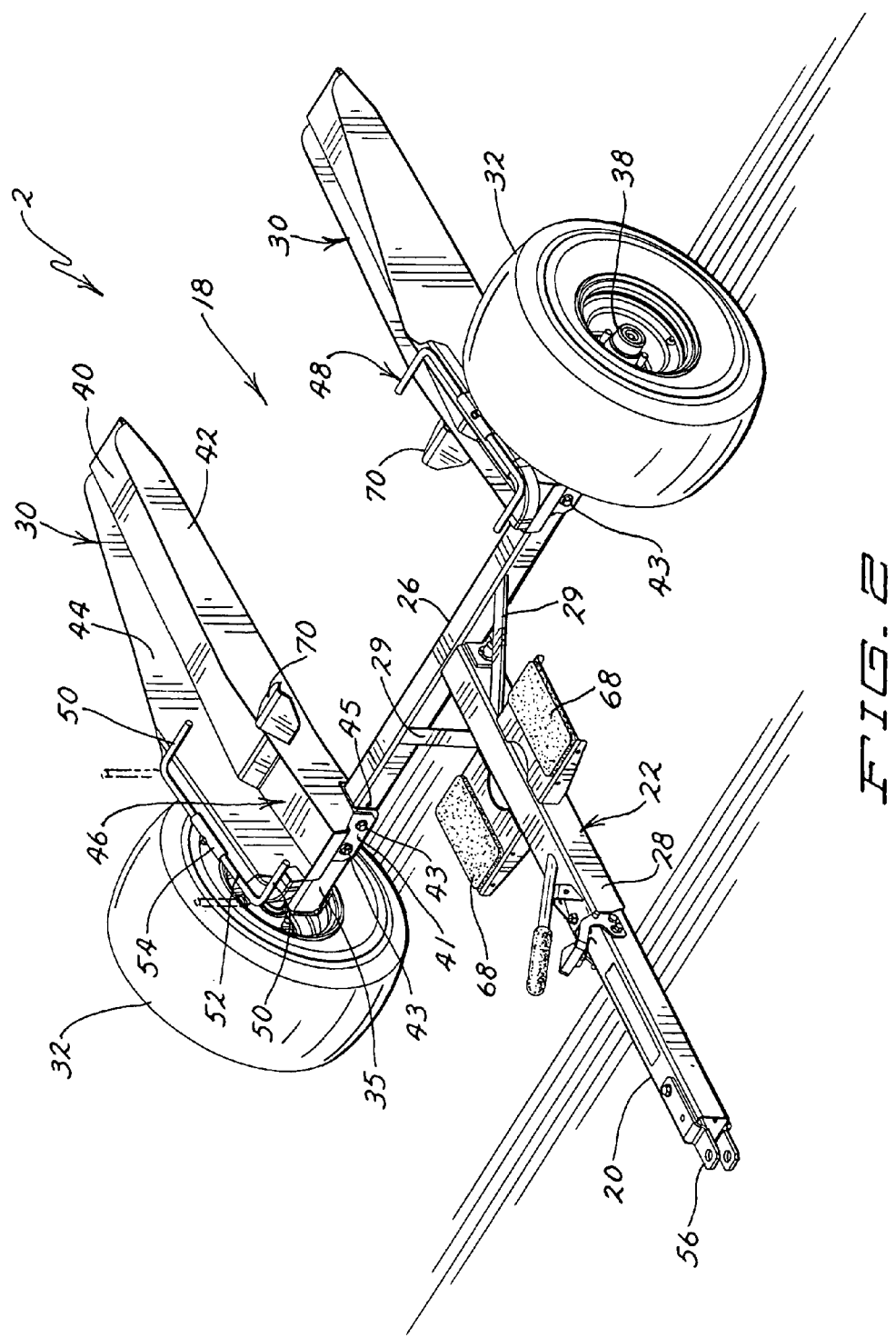
FIG. 2 is a perspective view of the trailer of FIG. 1, particularly illustrating an empty trailer without a walk greensmower carried thereon.

Referring to FIGS. 2 and 4, each wheel ramp 30 has a pivotal wheel lock 48 carried adjacent the top end of wheel ramp 30. Each wheel lock 48 is substantially U-shaped having spaced parallel locking prongs 50 at either end of a base rod 52. Wheel lock 48 is pivotally mounted on wheel ramp 30 with base rod 52 pivotally received in a pivot hub 54 carried on outer side wall 44 of wheel ramp 30.

Wheel lock 48 pivots between a substantially horizontal closed position and a substantially vertical open position. The solid line illustration in FIG. 2 shows the substantially horizontal closed positions of wheel locks 48. FIG. 2 also includes a phantom line illustration showing one wheel lock 48 in its substantially vertical open position.

In the substantially horizontal closed position, the spaced, parallel prongs 50 of wheel lock 48 are located adjacent the front and back sides of one of the transport wheels 12 of walk greensmower 4 when transport wheels 12 are received in wheel receiving recesses 46. This retains or locks transport wheels 12 within wheel receiving recesses 46 as shown in FIG. 1. In the substantially vertical open position of wheel lock 48, prongs 50 of wheel lock 48 are located to one side of wheel receiving recess 46. This allows transport wheel 12 to have free ingress and egress from wheel receiving recess 46.

Tongue 20 of trailer 2 comprises a tubular member having a portion 56 of a tow hitch at the front end of tongue 20. This permits tongue 20 to be connected to a tow vehicle to allow trailer 2 to be towed behind the vehicle.

The type of tow hitch used on the front of tongue 20 is not important to this invention. As shown in FIGS. 1-4, the tow hitch could be a clevis/pin type hitch with the portion 56 on the front of tongue 20 comprising a clevis that is adapted to be received on a vertical pin (not shown) on the tow vehicle. Obviously, the clevis and pin positions could be reversed, the clevis being carried on the tow vehicle and the pin comprising the portion of the hitch that is carried on tongue 20. A ball and socket type tow hitch, or other types of tow hitches, could also be used in place of a clevis/pin type hitch.

Trailer frame 18 and tongue 20 are connected together by a pivot pin 58 which passes through the rear end of tongue 20 and through the sides of arm 28 of T-shaped forward portion 22 of trailer frame 18. Pivot pin 58 is located immediately forwardly of crossmember 26 of trailer frame 18. The downwardly facing channel that forms arm 28 of trailer frame 18 is sized to be slightly larger than the tubular member that forms tongue 20. This permits arm 28 to fit down over and be received around tongue 20 as shown in FIG. 2.

Figure 3:
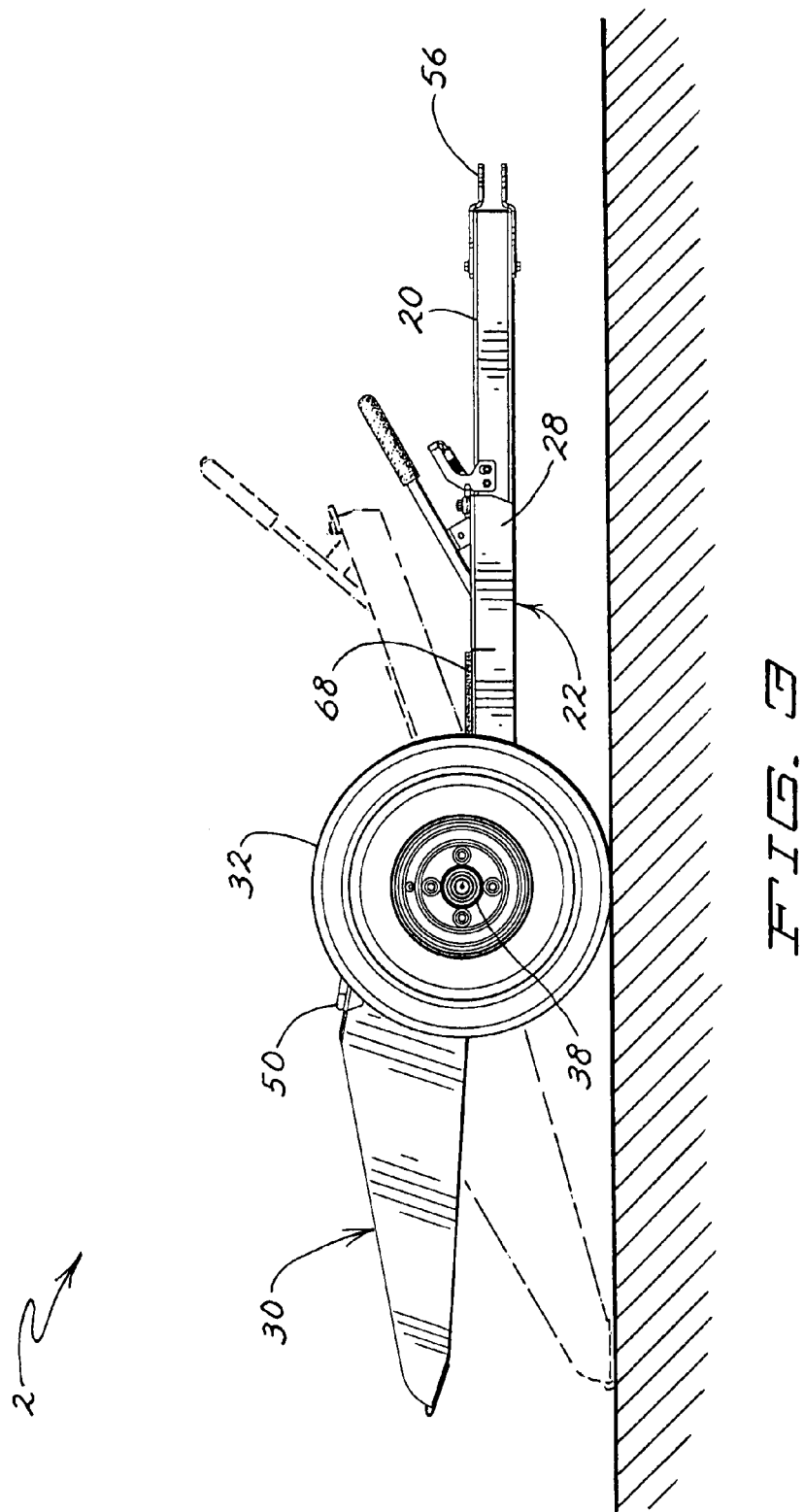
FIG. 3 is a side elevational view of the trailer of FIG. 1, the phantom line illustration showing a loading position of the trailer frame in which a walk greensmower may be loaded on the trailer and the solid line illustration showing a transport position of the trailer frame in which a walk greensmower may be carried by the trailer.
Figure 6:
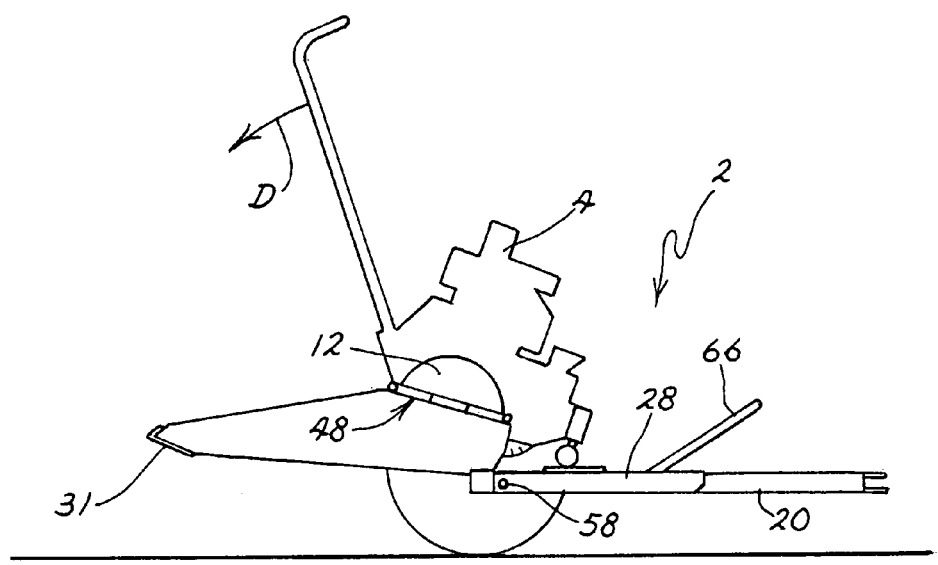
FIG. 6 is a diagrammatic view similar to FIG. 5 of the trailer of FIG. 1, particularly illustrating the trailer frame in its transport position and a walk greensmower being carried by the trailer.

Trailer frame 18 is pivotal relative to tongue 20 by virtue of pivot pin 58 such that trailer frame 18 can pivot between a transport position, shown in solid lines in FIG. 3, and a loading position, shown in phantom lines in FIG. 3. In the loading position, the outer free ends 31 of wheel ramps 30 are lowered into engagement with the ground to permit walk greensmower 4 to be loaded onto wheel ramps 30. In the transport position, free ends 31 of wheel ramps 30 are raised up out of engagement with the ground and trailer frame 18 is now substantially horizontal. Walk greensmower 4 is carried on trailer frame 18 in a substantially upright configuration, as shown in FIGS. 1 and 6, when trailer frame 18 is disposed in its transport position.

As trailer frame 18 pivots relative to tongue 20, it also pivots relative to the ground engaging trailer wheels 32. Pivotal motion of trailer frame 18 is permitted by the nature of wheel mounts 34 since stub axles 36 forming mounts 34 are able to pivot within wheel hubs 38. It is not clear whether trailer frame 18 pivots about pivot pin 58, about the axis formed by the centerline of wheel mounts 34, or about another intermediate axis between the two. What is known is that pivot pin 58 is close enough to the axis formed by the centerline of wheel mounts 34 so that the pivoting action of trailer frame 18 as illustrated in the drawings takes place. In observing this pivoting action, the Applicants have noticed that the front of tongue 20 raises up somewhat, which is permitted by play in the tow hitch, and trailer wheels 32 slide back slightly on the ground, thereby suggesting that the actual pivot axis of trailer frame 18 is located somewhere between the axis of pivot pin 58 and the axis formed by the centerline of wheel mounts 34.

A pivotal, spring biased latch 60 is mounted on tongue 20 ahead of the front end of arm 28 of T-shaped forward portion 22 of trailer frame 18. Latch 60 includes a locking notch 62 that is cooperable with a locking tab 64 carried on the front end of arm 28 to releasably lock or secure trailer frame 18 to tongue 20 when trailer frame 18 is in the transport position thereof. The spring bias on latch 60 normally keeps latch 60 engaged. When the operator manually releases latch 60 by pivoting latch 60 against the spring bias to release the engagement of notch 62 with locking tab 64, trailer frame 18 is freed relative to tongue 20 to allow trailer frame 18 to be pivoted into its loading position. Any suitable latch 60 may be used to lock trailer frame 18 on tongue 20 when trailer frame 18 is in its transport position.

Referring to FIG. 3, a handle 66 is provided on arm 28 of trailer frame 18 to allow the operator to pull arm 28 of trailer frame 18 upwardly as shown by the arrow A in FIG. 3. This enables the operator to manually pivot trailer frame 18 into its loading position after the operator has first released latch 60.

Figure 5:
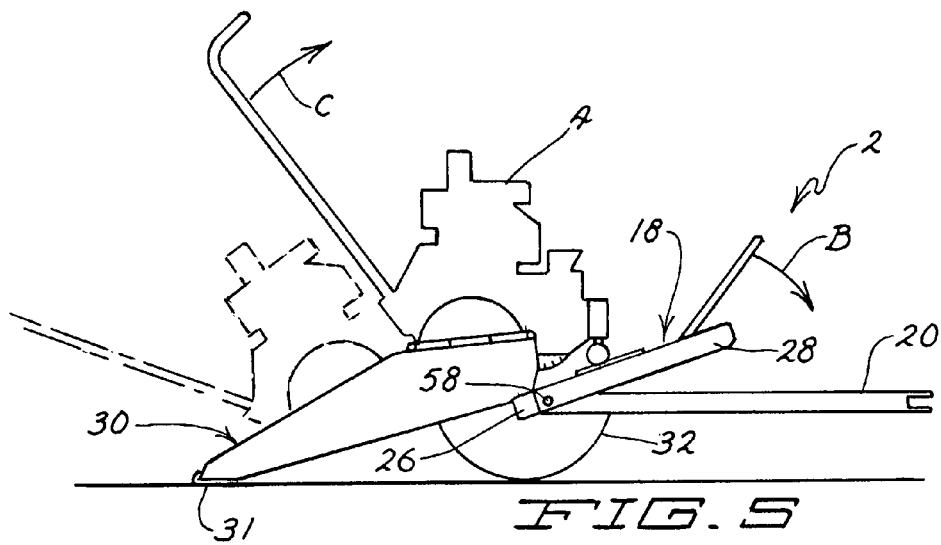
FIG. 5 is a diagrammatic view of the trailer of FIG. 1, particularly illustrating the trailer frame in its loading position and a walk greensmower being loaded onto the trailer.

FIG. 5 illustrates loading a walk greensmower 4 onto trailer 2. This is accomplished by first placing trailer frame 18 into its loading position with outer free ends 31 of wheel ramps 30 in engagement with the ground. Wheel locks 48 at the top ends of wheel ramps 30 are placed in their substantially vertical open position prior to a loading operation. In this orientation of wheel locks 48, trailer 2 is ready to receive a walk greensmower 4 thereon.

The operator may then drive walk greensmower 4 up onto trailer 2 by powering the traction system of walk greensmower 4 or by pushing walk greensmower 4 up onto trailer 2 if the operator prefers unpowered loading of walk greensmower 4. However, it is substantially easier to drive walk greensmower 4 up onto trailer 2 than it is to manually push walk greensmower 4 onto trailer 2. In any event, as walk greensmower 4 contacts trailer 2, transport wheels 12 on either side of walk greensmower 4 will contact and then ride up wheel ramps 30. The phantom line illustration in FIG. 5 shows walk greensmower 4 having moved about midway up wheel ramps 30.

When transport wheels 12 of walk greensmower 4 reach the top ends of wheel ramps 30, transport wheels 12 will reach and be seated within wheel receiving recesses 46. At this point, the operator may manually flip wheel locks 48 down until the locking prongs 50 on wheel locks 48 engage against the front and rear sides of transport wheels 12 to hold walk greensmower 4 on trailer frame 18. The solid line illustration of walk greensmower 4 in FIG. 5 shows walk greensmower 4 having reached the point where transport wheels 12 have entered wheel receiving recesses 46.

The transport position of trailer 2 is shown in FIG. 6. In this transport position, trailer frame 18 pivots relative to tongue 20 and relative to trailer wheels 32 until outer ends 31 of wheel ramps 30 rise up off the ground and until arm 28 of forward portion 22 of trailer frame 18 fits down over tongue 20. As arm 28 and tongue 20 come together, latch 60 is effective to engage locking tab 64 on arm 28 to latch or lock trailer frame 18 to tongue 20 in the transport position thereof. In this transport position, walk greensmower 4 can then be carried from place to place merely by hitching tongue 20 to a tow vehicle and using the tow vehicle to move trailer 2. During this transport operation, walk greensmower 4 merely rides for the most part on wheel ramps 30 of trailer 2.

When walk greensmower 4 reaches the point where transport wheels 12 have entered wheel receiving recesses 46 while loading as shown in FIG. 5, the operator then manually pivots trailer frame 18 into its transport position of FIG. 6. This can be done by pushing down on handle 66 on trailer frame 18 as indicated by the arrow B in FIG. 5. Alternatively, the operator could lift up on handle assembly 16 of walk greensmower 4 as indicated by the arrow C in FIG. 5 to manually pivot trailer frame 18 into its transport position. Manual pivoting of trailer frame 18 from its loading into its transport position is preferred over a situation where the forward weight distribution of walk greensmower 4 is used to bias trailer frame 18 down into its transport position.

No horizontal bed or floor is provided on trailer 2 for supporting walk greensmower 4. The space between wheel ramps 30 is substantially open and is wide enough so that traction drum 10 of walk greensmower 4 freely fits between wheel ramps 30. Two small horizontal pads 68 can be affixed to arm 28 of trailer frame 18, one on either side of arm 28, so that the front roller 13 of cutting unit 14 rests on pads 68. Pads 68 provide additional side-to-side stability to prevent the front of walk greensmower 4 from rolling from side-to-side about arm 28 of trailer 2. Obviously, pads 68 are quite small and require much less material than a complete floor or trailer bed.

One of the advantages of trailer 2 of this invention is the simplicity and economy of material and components. Trailer 2 has no bed and simply uses wheel ramps 30 to mainly support walk greensmower 4. Thus, trailer 2 is relatively inexpensive to manufacture and sell, and thus relatively inexpensive to purchase. However, a walk greensmower 4 can still be easily and quickly loaded on trailer 2 merely by driving walk greensmower 4 up wheel ramps 30 until transport wheels 12 reach wheel receiving recesses 46.

Walk greensmower 4 can be unloaded from trailer 2 very easily and quickly when desired after trailer 2 has moved walk greensmower 4 to a desired destination. Once there, the operator then unlatches latch 60 to free trailer frame 18 from tongue 20 and uses handle 66 to pull up on forward portion 22 of trailer frame 18, thus pivoting trailer frame 18 and lowering rearward portion 24 of trailer frame 18 until free ends 31 of wheel ramps 30 engage against the ground. The operator then simply flips wheel locks 48 up until locking prongs 50 on wheel locks 48 have cleared transport wheels 12. Walk greensmower 4 can then be driven or rolled back down wheel ramps 30 and onto the ground. A single operator can easily load and unload a walk greensmower using trailer 2 of this invention.

Figure 7:
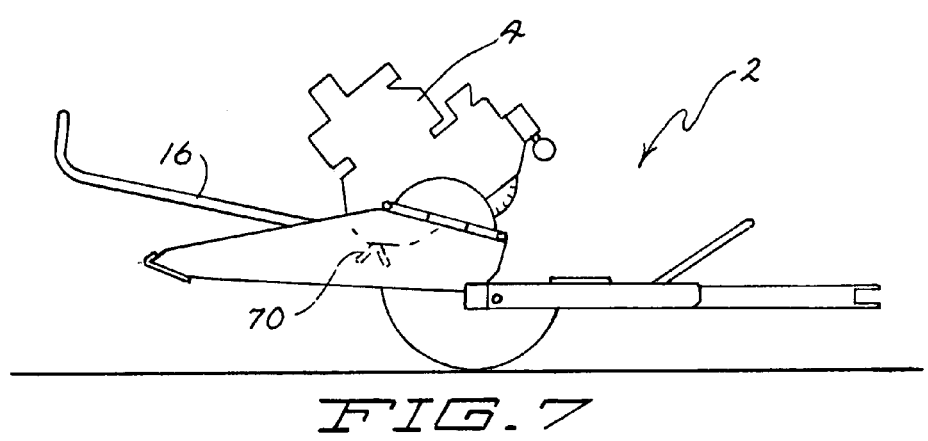
FIG. 7 is a diagrammatic view similar to FIG. 5 of the trailer of FIG. 1, particularly illustrating the trailer frame in its transport position with the walk greensmower having been tilted back on the trailer frame into a service position.
Figure 8:
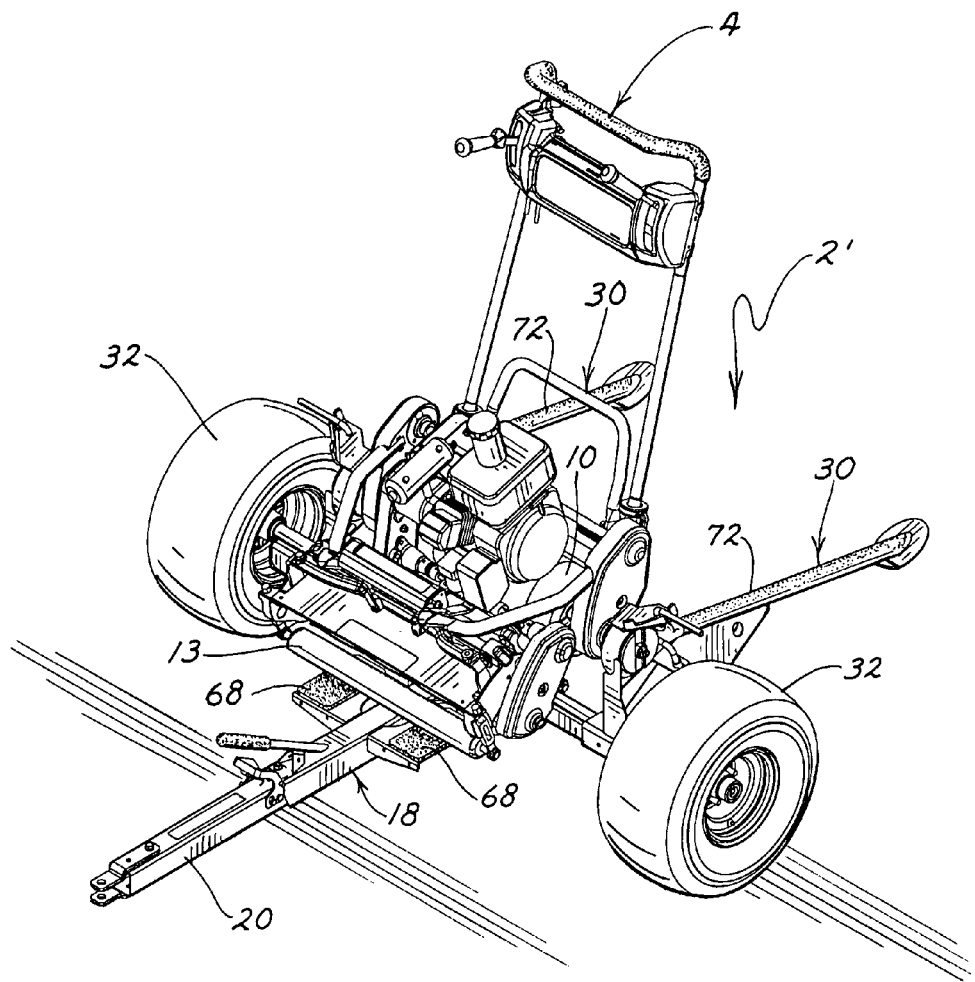
FIG. 8 is a perspective view of a second embodiment of a trailer according to this invention, particularly illustrating a loaded trailer carrying a walk greensmower.
Figure 9:
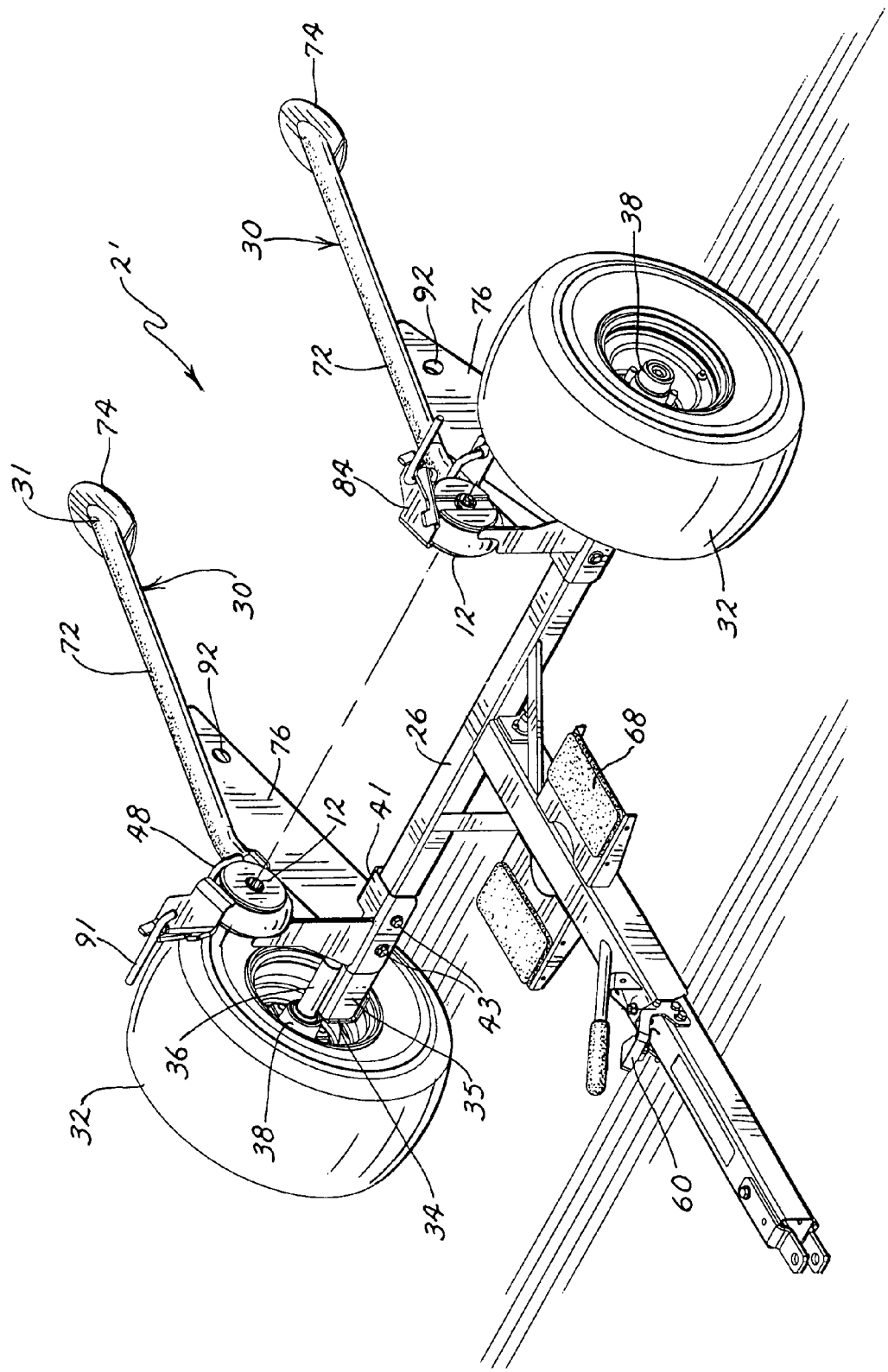
FIG. 9 is a perspective view of the trailer of FIG. 8, particularly illustrating an empty trailer without a walk greensmower carried thereon but showing the transport wheels of the walk greensmower locked in place on the wheel ramps of the trailer frame.
Figure 10:
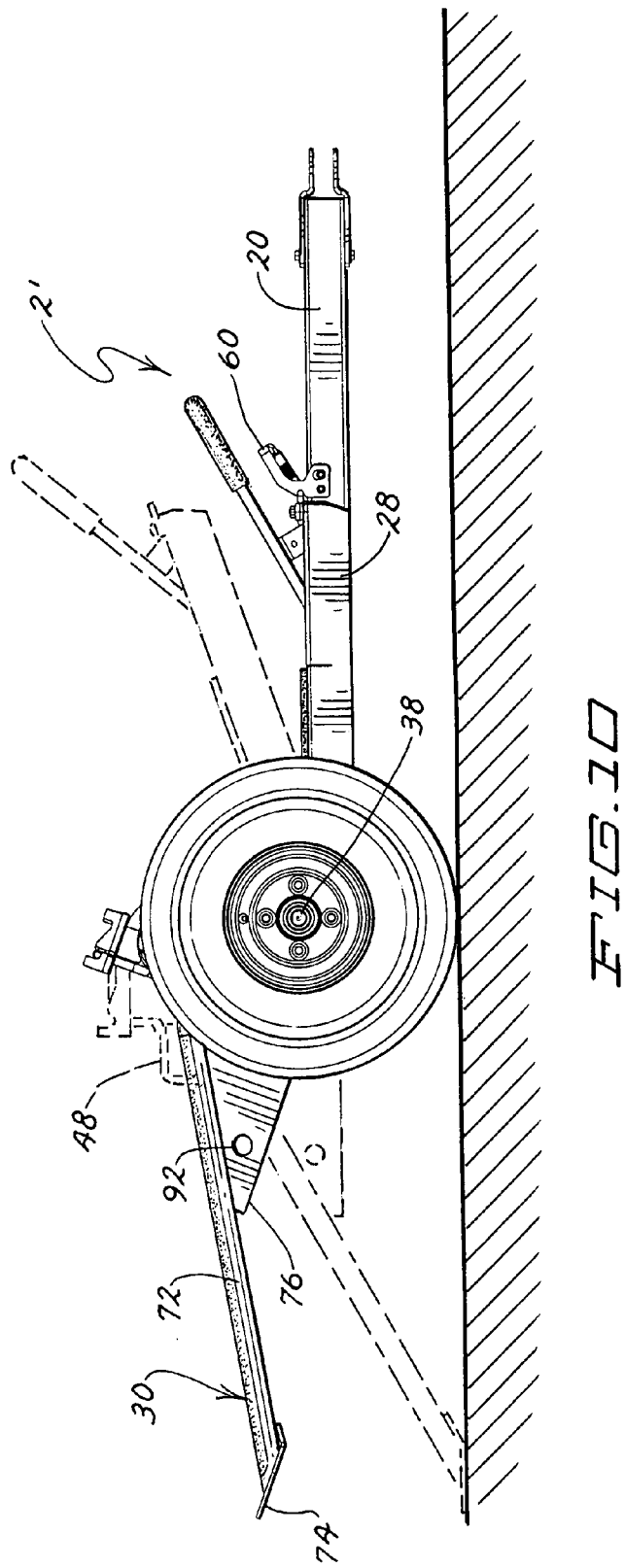
FIG. 10 is a side elevational view of the trailer of FIG. 8, the phantom line illustration showing a loading position of the trailer frame in which a walk greensmower may be loaded on the trailer and the solid line illustration showing a transport position of the trailer frame in which a walk greensmower may be carried by the trailer.
Figure 11:
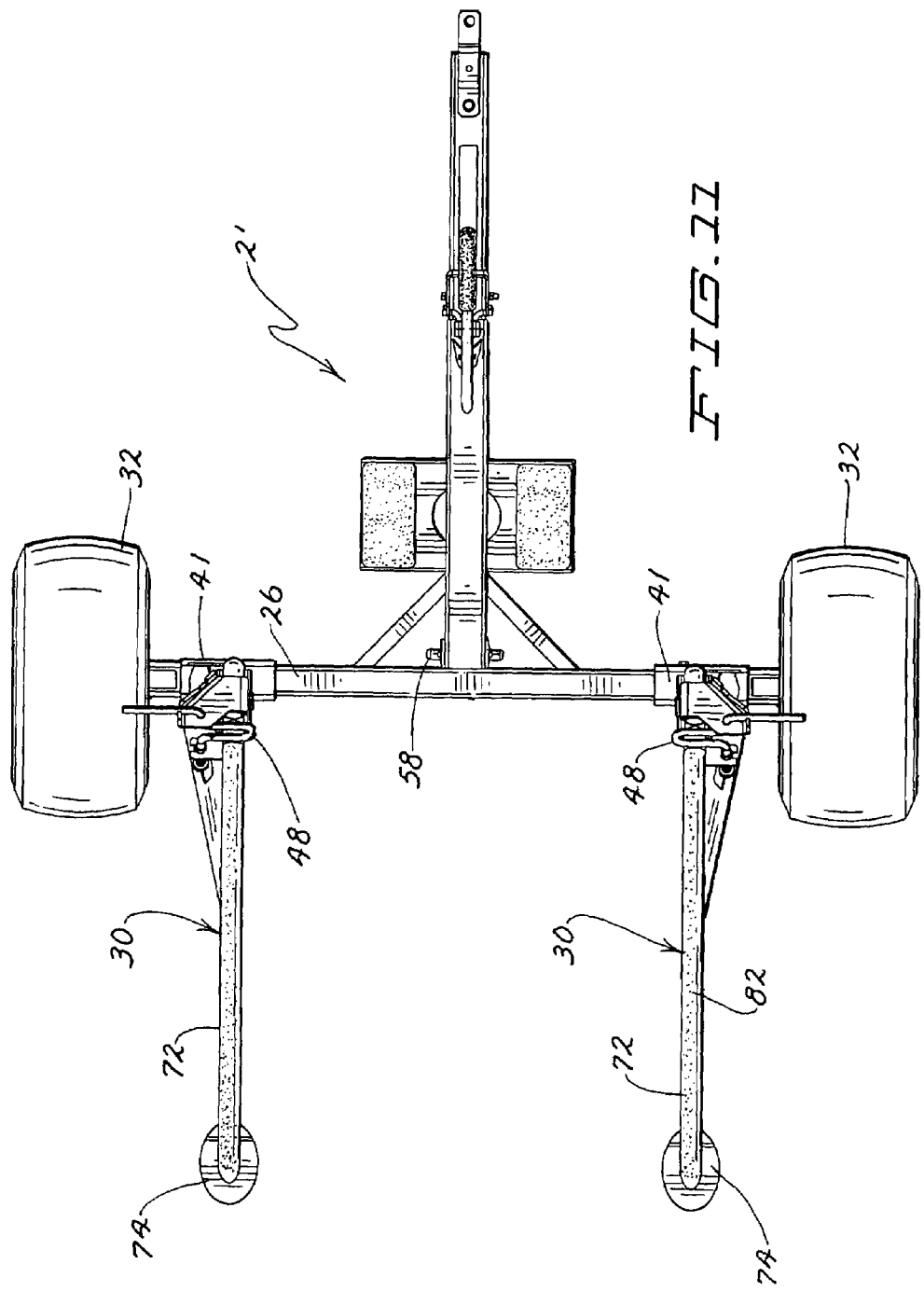
FIG. 11 is a top plan view of the trailer of FIG. 8.

Referring now to FIGS. 2 and 7, trailer 2 also provides a convenient work stand for allowing the operator to service or adjust various portions of walk greensmower 4, such as adjusting cutting unit 14. Each wheel ramp 30 includes a V-shaped abutment flange 70 on inner side wall 42 thereof protruding into the space between wheel ramps 30. Flanges 70 are located low enough on inner side walls 42 so as not to interfere with traction drum 10.

When walk greensmower 4 is placed on trailer 2 in its transport position and is locked in this position by wheel locks 48, walk greensmower 4 is still free to tilt about the axis of transport wheels 12 and traction drum 10. Walk greensmower 4 can selectively be tilted back while on trailer 2 by pulling rearwardly on the top of handle assembly 16 as indicated by the arrow D in FIG. 6. This tilting will continue until handle assembly 16 or a portion of walk greensmower frame 6 engages against abutment flanges 70. Walk greensmower 4 will then be retained in this rearwardly tilted position with the front of walk greensmower 4, including cutting unit 14, being elevated relative to front portion 22 of trailer frame 18 to provide access to cutting unit 14 for service or adjustment.

FIG. 7 depicts the rearwardly tilted position of walk greensmower 4 with abutment flanges 70 engaging against a portion of walk greensmower 4 to hold walk greensmower 4 in the service position. The relatively unobstructed configuration of T-shaped forward portion 22 of trailer frame 18 and the fact that the operator is standing on the ground while walk greensmower 4 is elevated above the ground enhances the ease with which the operator can service or adjust walk greensmower 4. For example, the operator can stand on either side of central arm 28 close to cutting unit 14 to easily reach and service all portions of cutting unit 14. Thus, trailer 2 also conveniently doubles as an effective work stand for allowing easy access to various components of walk greensmower 4, particularly to the front mounted cutting unit 14.

The Embodiment of FIGS. 8-17

A second embodiment of a trailer according to this invention is illustrated as 2' in FIGS. 8-17. Trailer 2' has many of the same components as trailer 2 . Corresponding components will be identified using the same reference numerals as used in the foregoing description of trailer 2. Only the differences between the two trailers 2, 2' will be specifically described.

Wheel ramps 30 of trailer 2' comprise elongated cylindrical rods or rails 72 rather than ramps 30 having a substantially flat bottom wall 40. Outer free ends 31 of rails 72 each have a planar foot pad 74. Foot pads 74 are adapted to rest flat against the ground when trailer frame 18 is in its loading position as best shown in the phantom line illustration in FIG. 10. A flange 76 extends downwardly from the underside of each rail 72 near the top end of each rail 72. Flange 76 serves as a reinforcing gusset between rail 72 and crossmember 26.

Transport wheels 12 on walk greensmower 4 are modified to have a diameter significantly less than the diameter of traction drum 10. During normal operation of walk greensmower 4 when cutting grass, transport wheels 12 do not engage the ground but remain elevated above the ground. Transport wheels 12 thus do not normally drive walk greensmower 4 at all. Transport wheels 12 come into play only when walk greensmower 4 is being loaded onto trailer 2'.

Figure 15:
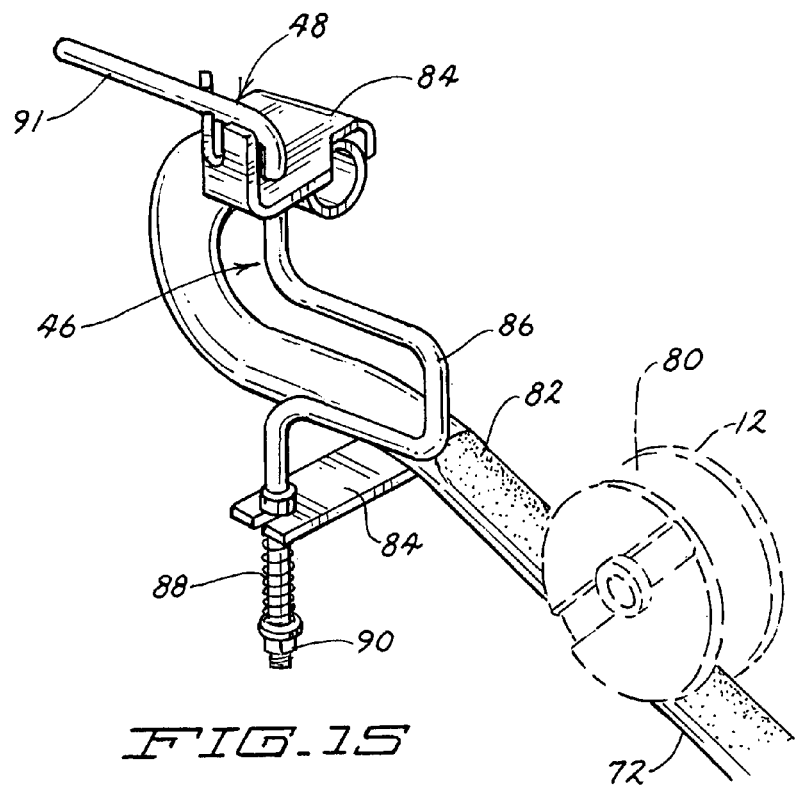
FIG. 15 is an enlarged perspective view of a portion of one of the wheel ramps of the trailer frame of the trailer of FIG. 8, particularly illustrating one of the transport wheels on the walk greensmower approaching the top end of the wheel ramp with the wheel lock for the transport wheel being shown in an open position.
Figure 16:
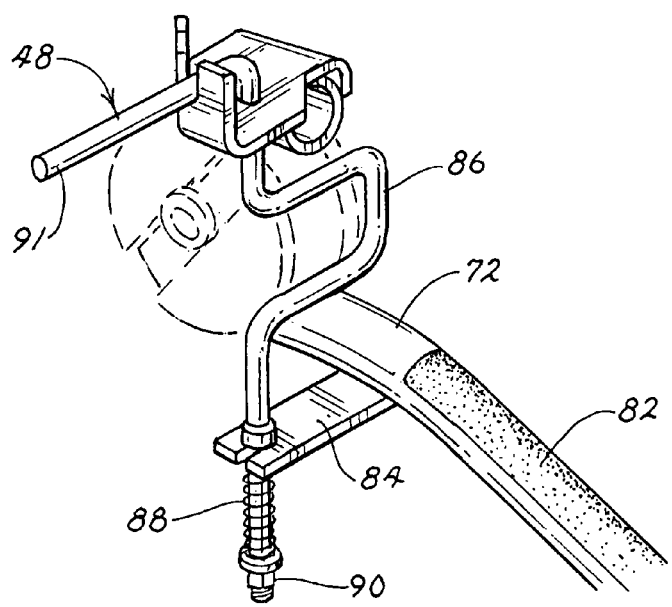
FIG. 16 is an enlarged perspective view similar to FIG. 15 of a portion of one of the wheel ramps of the trailer frame of the trailer of FIG. 8, particularly illustrating one of the transport wheels on the walk greensmower located at the top end of the wheel ramp with the wheel lock for the transport wheel having been pivoted into a closed position.
Figure 17:
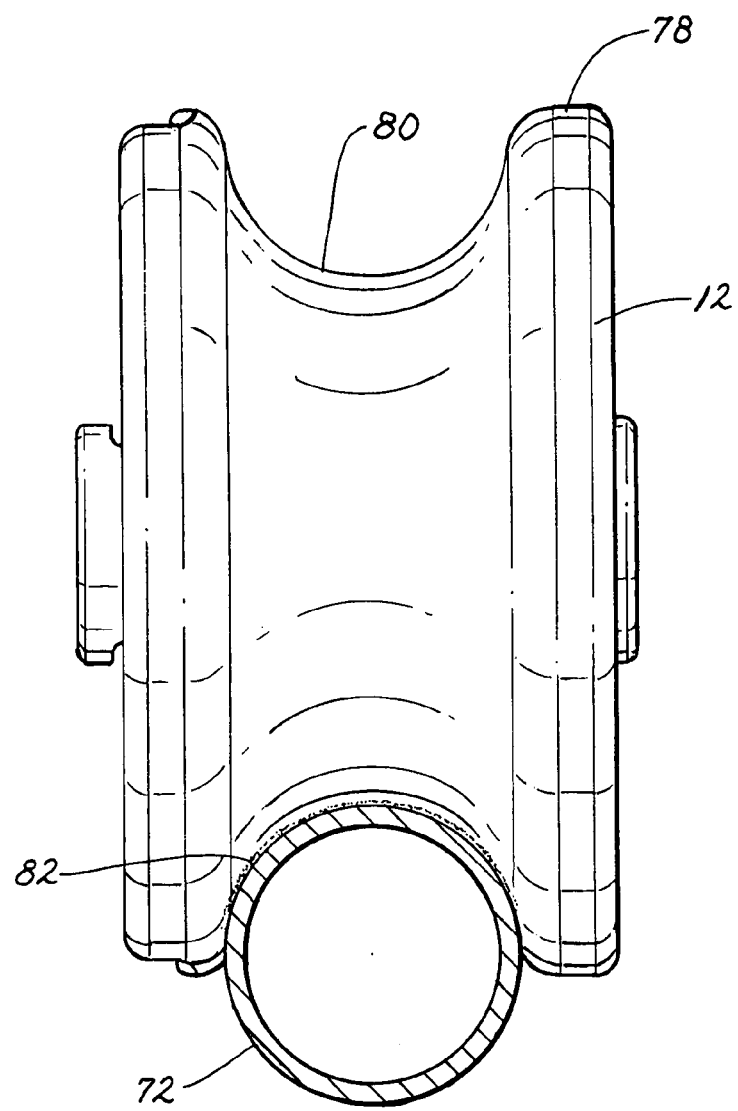
FIG. 17 is a partial cross-sectional view through one of the wheel ramps of the trailer of FIG. 8, showing the cylindrical cross-sectional configuration of the wheel ramp and the mating concave configuration of the outer rim of the transport wheel of the walk greensmower.

Referring to FIGS. 15-17, transport wheels 12 have an outer rim 78 with a concave groove 80 much like that found in a pulley. The concavity of groove 80 is shaped to match the cylindrical configuration of rails 72 as best shown in FIG. 17. Each transport wheel 12 will ride up one of rails 72 with groove 80 receiving and rolling along the top side or upper half of rail 72. See FIG. 17. To help ensure traction between rail 72 and transport wheel 12, the top side of rail 72 can be roughened or carry a traction enhancing material as indicated generally at 82.

The top end of each rail 72 has a rearwardly facing U-shape which defines a rearwardly facing wheel receiving recess 46. Transport wheel 12 is designed to fit within recess 46. FIG. 15 illustrates transport wheel 12 as it approaches wheel receiving recess 46. FIG. 16 illustrates transport wheel 12 after it is seated in wheel receiving recess 46.

Each rail 72 carries a wheel lock 48 for holding transport wheel 12 in wheel receiving recess 46. Wheel lock 48 is pivotally supported on top and bottom pivot brackets 84 on the top end of rail 72 for pivoting between two vertical positions. The first vertical position of wheel lock 48 is shown in FIG. 15 and is an open position in which wheel lock 48 is spaced to one side of rail 72 to be out of the way of wheel receiving recess 46. The second vertical position of wheel lock 48 is shown in FIG. 16 and is a closed position in which wheel lock 48 extends over rail 72. The top of wheel lock 48 includes a horizontal handle portion 91 to allow the operator to better grip and pivot wheel lock 48 between its open and closed positions.

A U-shaped central portion 86 of wheel lock 48 engages against the rear side of transport wheel 12 after transport wheel 12 is seated in wheel receiving recess 46. A spring 88 is provided between an abutment 90 on wheel lock 48 and one of the brackets 84. Spring 88 provides a force tending to hold wheel lock 48 in either the open position shown in FIG. 15 or the closed position shown in FIG. 16. The operator can manually flip or pivot wheel lock 48 back and forth between its open and closed positions.

Figure 12:
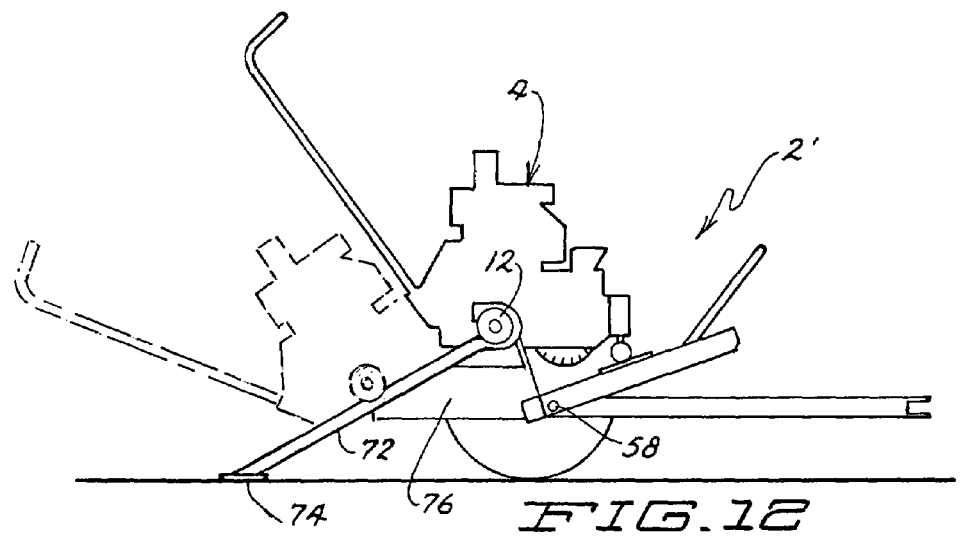
FIG. 12 is a diagrammatic view of the trailer of FIG. 8, particularly illustrating the trailer frame in its loading position and a walk greensmower being loaded onto the trailer.

Referring now to FIG. 12, walk greensmower 4 is loaded onto trailer 2' in much the same way as walk greensmower 4 was loaded on trailer 2 of the first embodiment. Trailer frame 18 is first pivoted down into its loading position and wheel locks 48 are placed in their open positions. Walk greensmower 4 is then driven towards trailer 2 with traction drum 10 passing between rails 72. At some point, the grooves 80 in transport wheels 14 will engage against the top sides of rails 72 and will then begin to drive walk greensmower 4 up rails 72. As transport wheels 12 ascend rails 72, traction drum 10 will be lifted up out of contact with the ground such that transport wheels 12 alone will be the driving force for driving walk greensmower 4 up rails 72. This will continue until transport wheels 12 reach the top ends of rails 72 and become seated in wheel receiving recesses 46.

Figure 13:
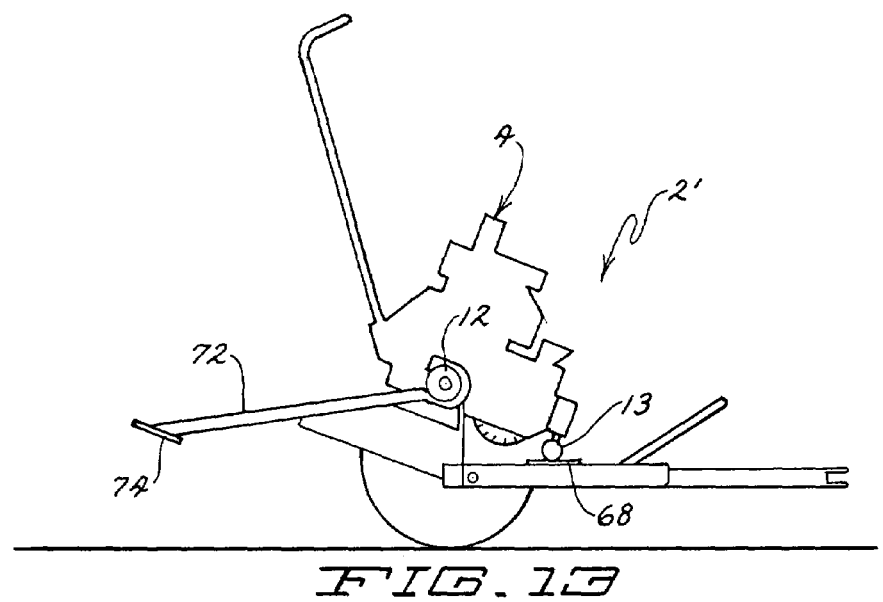
FIG. 13 is a diagrammatic view similar to FIG. 12 of the trailer of FIG. 8, particularly illustrating the trailer frame in its transport position and a walk greensmower being carried by the trailer.

At the point where walk greensmower 4 becomes loaded onto trailer 2' with transport wheels 12 being seated in wheel receiving recesses 46, the operator will manually pivot trailer frame 18 back down into its transport position. As shown in FIG. 13, in this position arm 28 of trailer frame 18 moves back down over tongue 20 and locks thereto by virtue of latch 60. The operator can then flip wheel locks 48 over from their open to their closed positions. U-shaped central portion 86 of wheel locks 48 will bear against the rear sides of transport wheels 12 to retain walk greensmower 4 in place on trailer 2'. Trailer 2' can then be towed by any type of tow vehicle to move walk greensmower 4 from one location to another.

The use of transport wheels 14 with grooves 80 riding on cylindrical rails 72 helps align and guide walk greensmower 4 as it is being driven into engagement with trailer 2'. In addition, because transport wheels 12 are smaller than traction drum 10, they may be left in place continuously and need not be removed from the extended axle portions of traction drum 10 during a cutting operation.

Figure 14:
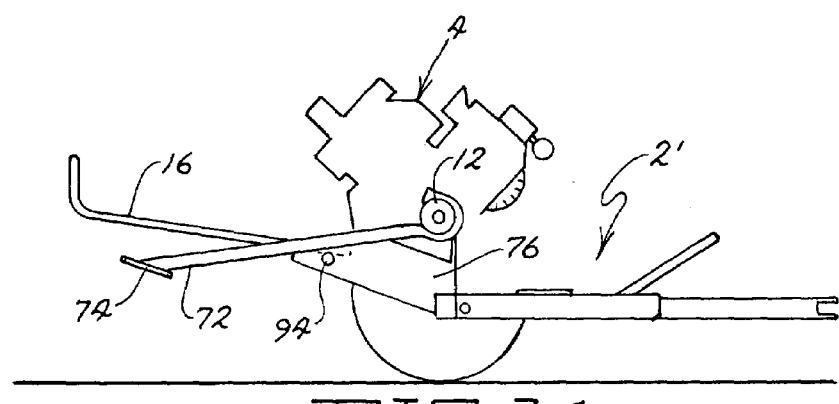
FIG. 14 is a diagrammatic view similar to FIG. 12 of the trailer of FIG. 8, particularly illustrating the trailer frame in its transport position with the walk greensmower having been tilted back on the trailer frame into a service position.

Trailer 2' also provides a convenient service position as best shown in FIG. 14. Flanges 76 depending from the underside of rails 72 have aligned holes 92 therein which are suited for receiving a transversely extending broom handle or other cylindrical rod 94. When a broom handle or cylindrical rod 94 is inserted through holes 92, it forms a stop located between rails 72. Walk greensmower 4 can then be tilted back until a portion of handle assembly 16 or greensmower frame 6 engages against broom handle or rod 94. This retains walk greensmower 4 in its rearwardly tilted service position with cutting unit 14 being elevated relative to trailer frame 18 for service or adjustment.

The Embodiment of FIGS. 18-23

Trailers 2, 2' of the first two embodiments employ a simple, economical structure that is relatively inexpensive to produce and thus to purchase. This structure is bedless in the sense there is no large horizontal floor or bed on trailers 2, 2'. However, a walk greensmower 4 using transport wheels 12 having grooves 80 riding on cylindrical rails 72 would be advantageous on other trailers, including more conventionally constructed trailers having a horizontal floor or bed. FIGS. 18-21 disclose an embodiment of a trailer which has such a bed which is adapted to use the cylindrical rails 72 and transport wheels 14 having grooves 80 disclosed in FIGS. 8-17.

A further trailer according to this invention is thus illustrated in FIGS. 18-21 generally as 2". To the extent trailer 2" has the same components as trailers 2, 2' of the first two embodiments, the same reference numerals will be used. Thus, trailer 2" will have a trailer frame 18, a pair of left and right ground engaging trailer wheels 32, and a tongue 20. But, trailer frame 18 no longer pivots relative to tongue 20. Tongue 20 is rigidly attached or secured to trailer frame 18. Trailer frame 18 is only pivotal about the wheel mounts of the ground engaging trailer wheels 32 and any such pivoting of trailer frame 18 does not place trailer frame 18 into a loading position.

Figure 18:
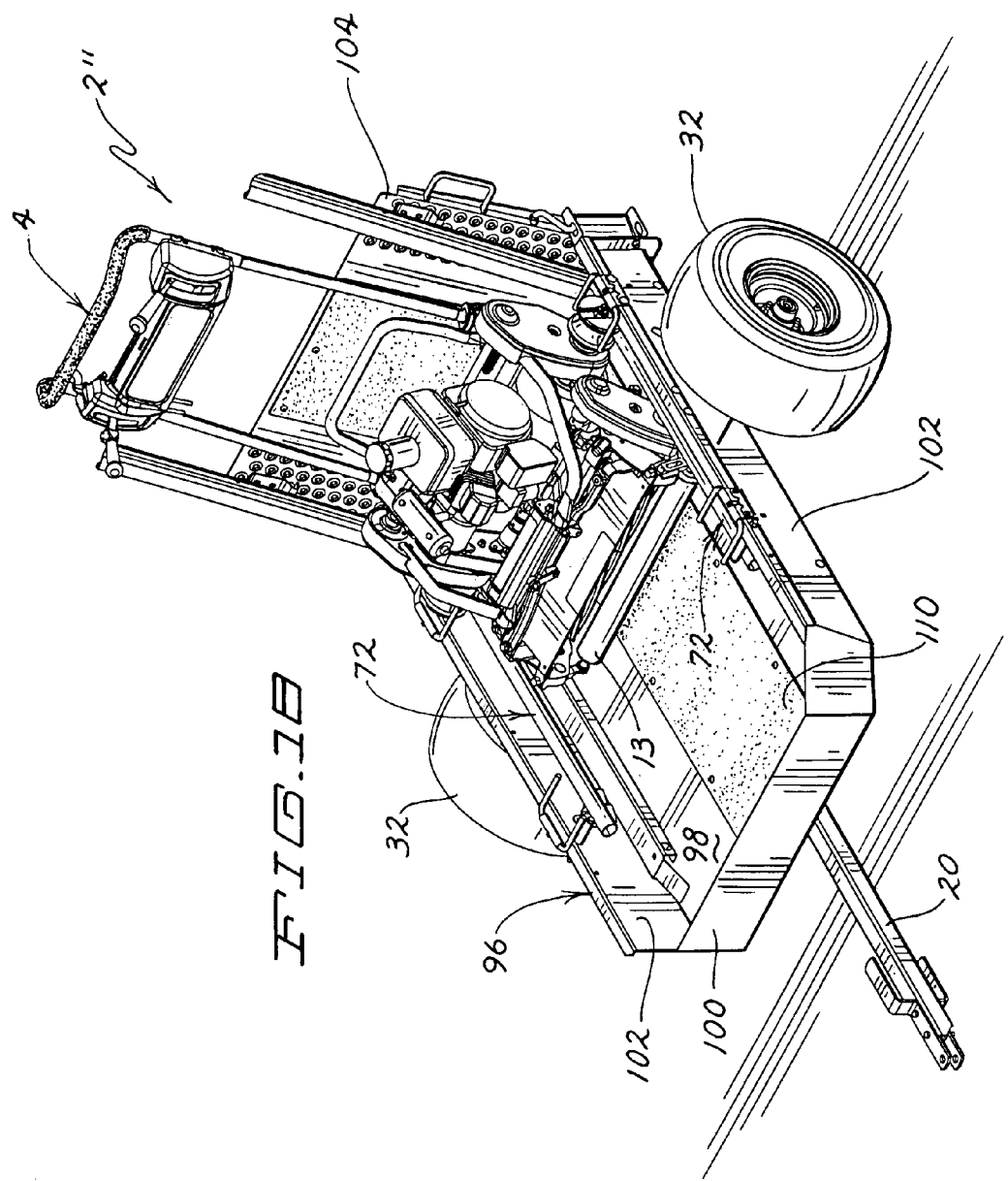
FIG. 18 is a perspective view of a third embodiment of a trailer according to this invention, particularly illustrating a loaded trailer carrying a walk greensmower in a rear storage position with the endgate of the trailer pivoted up into a transport position.
Figure 19:
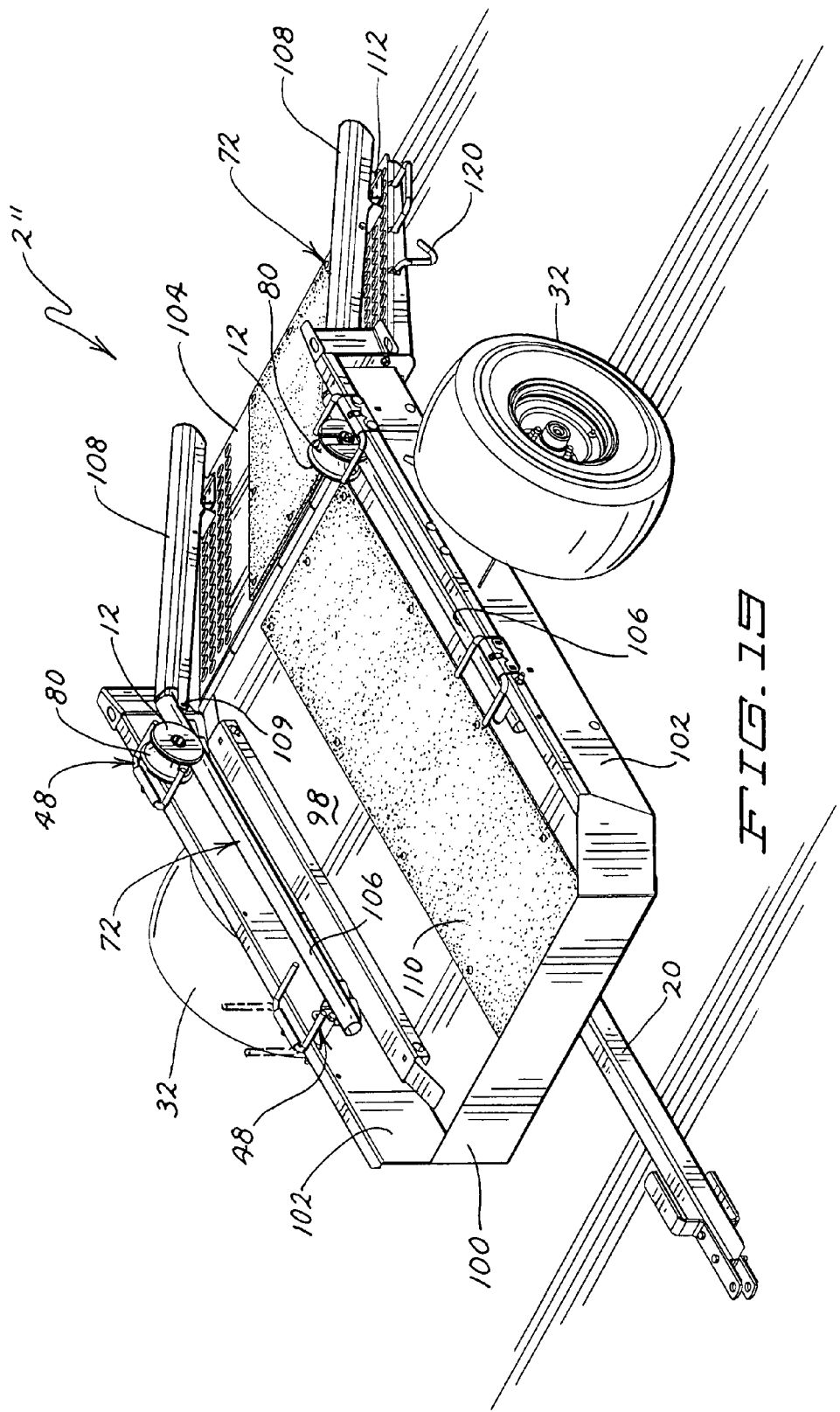
FIG. 19 is a perspective view of the trailer of FIG. 18, particularly illustrating an empty trailer without a walk greensmower mounted thereon but showing the transport wheels of the walk greensmower locked in place on the wheel ramps of the trailer frame in the rear storage position and particularly illustrating the endgate of the trailer pivoted down into a loading position.
Figure 20:
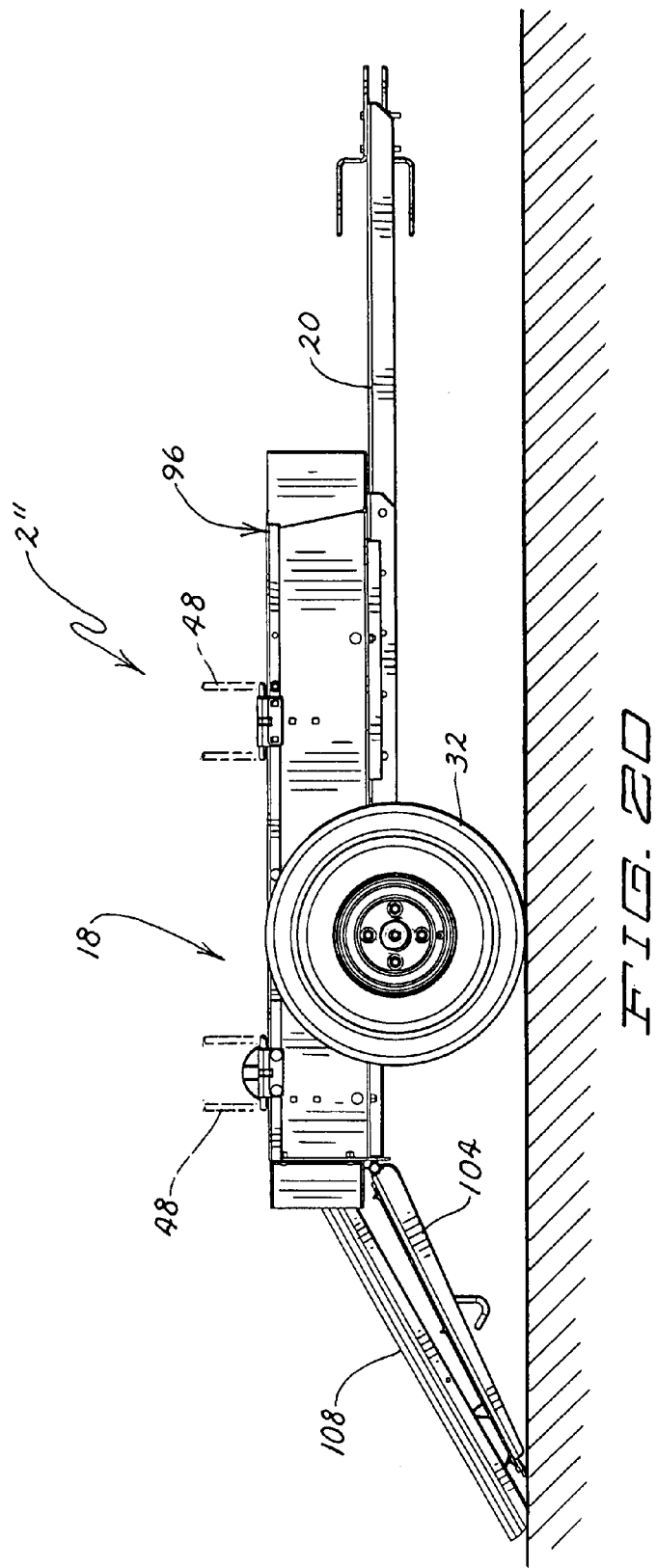
FIG. 20 is a side elevational view of the trailer of FIG. 18, particularly illustrating the endgate of the trailer pivoted down into a loading position.

Trailer frame 18 is now shaped as a rigid box 96 having a horizontal floor or bed 98, a front wall 100, and side walls 102. The rear of box 96 is completed by a pivotal endgate 104. Endgate 104 is pivotal relative to trailer frame 18 until the rear edge of endgate 104 engages against the ground as shown in FIGS. 19 and 20. This is a loading position of trailer frame 18. Endgate 104 can be pivoted up on trailer frame 18 into a raised position as shown in FIG. 18. This is a transport position of trailer frame 18. However, unlike trailers 2, 2' of the first two embodiments, in the transport position of trailer frame 18 of trailer 2", walk greensmower 4 has been moved onto and over bed 98 of trailer frame 18 and is not supported by the pivotal endgate 104 itself.

A pair of cylindrical rails 72 are used on trailer 2". Each rail 72 is provided in two sections, a front fixed section 106 and a pivotal rear section 108. The front fixed section 106 of each rail 72 is rigidly attached to and carried on one of the side walls 102 of trailer frame 18. The pivotal rear section 108 is pivotally carried on the rear end of front fixed section 106 by a pivot pin 109. See FIGS. 19 and 22.

To prevent undue lateral motion of the pivotal rear sections 108 of rails 72, guides 112 are provided on each side of endgate 104. Each guide 112 projects up into a slot 114 on the underside of a rear section 108 to prevent rear section from laterally wobbling too much from side-to-side relative to endgate 104. When rear sections 108 and endgate 104 are raised into a transport position, as shown in FIG. 18, a hooked front end 116 on guide 116 grabs a crosspin 118 on its corresponding rear section 108 to retain each rear section 108 in the raised position shown in FIG. 18. Endgate 104 is itself retained in the raised position by hooks 120 on endgate 104 that can be engaged with trailer frame 18. One hook 120 is shown in FIG. 19.

To load a walk greensmower on trailer 2", endgate 104 of trailer 2" is first pivoted down into the loading position. Rear sections 108 of rails 72 will follow endgate 104 down into the loading position due to gravity since rear sections 108 were never raised over center in the raised transport position of FIG. 18. When endgate 104 and rear sections 108 of rails 72 are in the loading position of FIG. 19, walk greensmower 4 is then driven towards trailer 2" with traction drum 10 doing the propelling.

As walk greensmower 4 reaches endgate 104, traction drum 10 will start to move up endgate 104 until transport wheels 12 engage against and start to ride up the rear sections 108 of rails 72. As this happens, traction drum 10 is lifted slightly up out of contact with endgate 104 since rails 72 are set high enough above the upper face of endgate 104 to accomplish this. Walk greensmower 4 is then simply driven up endgate 104 and then into box 96 of trailer frame 18, transport wheels 12 simply moving from the pivotal rear sections 108 of rails 72 to the fixed front sections 106 of rails 72. Fixed front sections 106 of rails 72 are also high enough to keep traction drum 10 out of contact with bed 98.

Once walk greensmower 4 is driven into box 96 of trailer frame 18, walk greensmower 4 can be stopped at a particular front or rear storage position along the fixed front sections of rails 72. Once stopped, the weight distribution of walk greensmower 4 will cause walk greensmower 4 to tip forwardly about the rotational axis of transport wheels 12 until front roller 13 on cutting unit 14 engages against bed 98 of trailer frame 18. See FIG. 18. In this respect, bed 98 of trailer frame 18 can be covered with a soft rubber cushion 110 or the like to prevent damage to roller 13 or cutting unit 14. Thus, walk greensmower 4 once loaded on trailer 2 will be retained in a slightly forwardly tilted condition, as best shown in FIG. 18.

Figure 21:
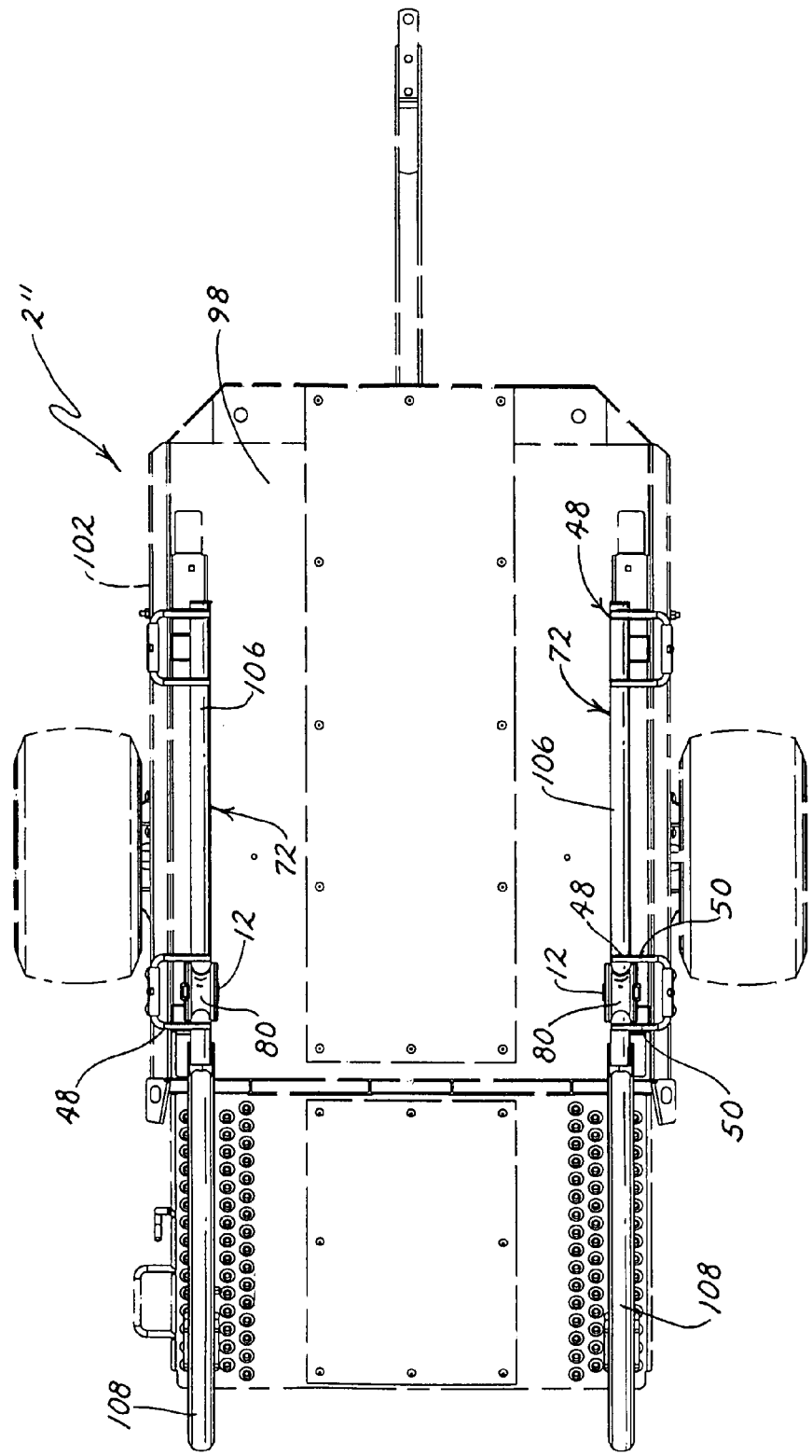
FIG. 21 is a top plan view of the trailer of FIG. 18, particularly illustrating the endgate of the trailer pivoted down into a loading position.
Figure 22:
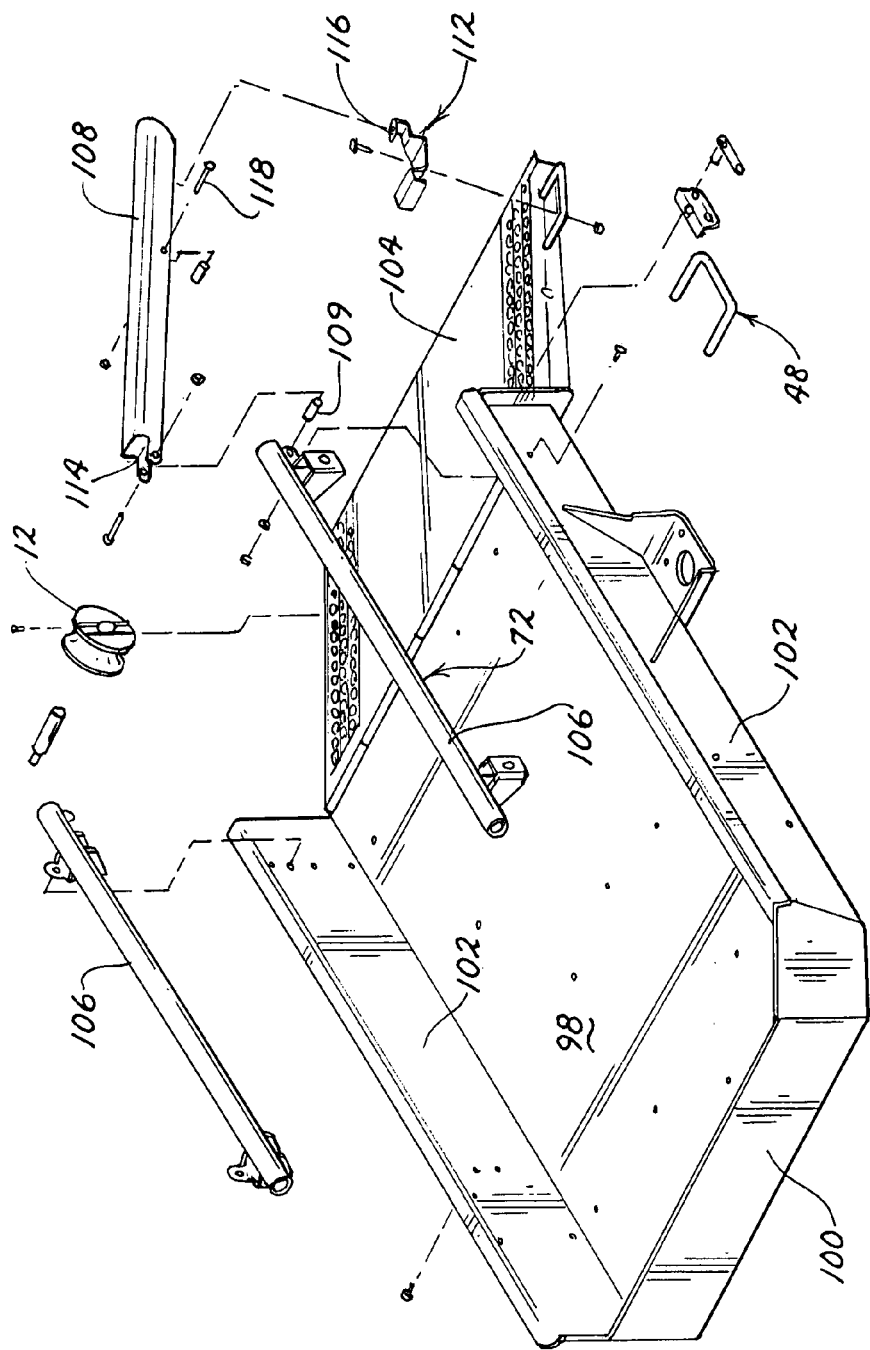
FIG. 22 is a perspective view of a portion of the trailer of FIG. 18, particularly illustrating some of the components of the trailer including the rails in an exploded form relative to the trailer box and the endgate.
Figure 23:
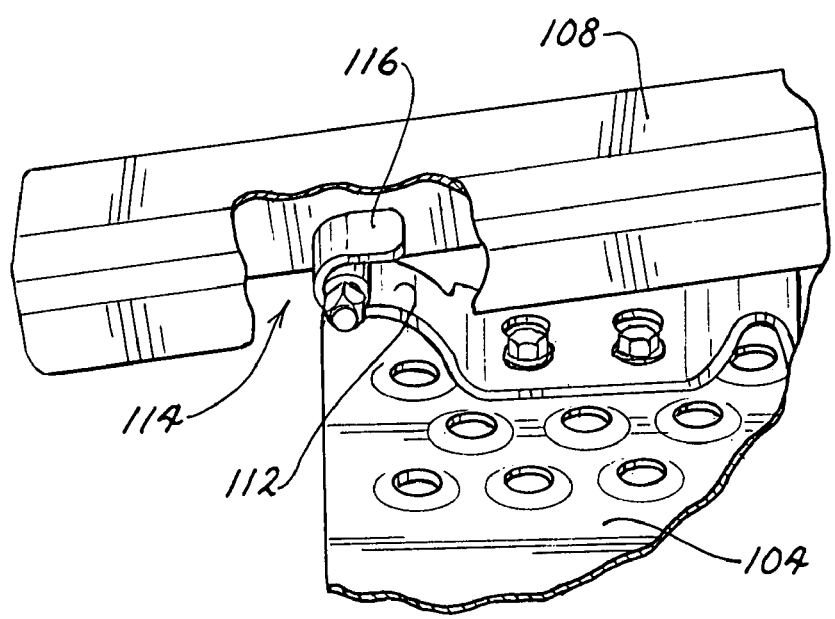
FIG. 23 is an enlarged perspective view of a portion of the trailer of FIG. 18, particularly illustrating the coaction between the pivotal rear section of the rail and a guide carried on the endgate.

Walk greensmower 4 can be retained in place on trailer frame 18 by pivotal wheel locks 48 like those used on trailer 2 of the first embodiment. Wheel locks 48 are pivoted to the top edges of side walls 102 of trailer frame 18. Wheel locks 48 have a vertical open position and a horizontal closed position. In the horizontal closed position, prongs 50 of wheel locks 48 are received around the front and rear sides of transport wheels 12 to prevent transport wheels 12, and thus walk greensmower 4, from rolling forwardly or rearwardly on rails 72. This is best shown in FIG. 21.

Trailer 2" can be made long enough to store two walk greensmowers 4 in a tandem fashion. As shown in FIG. 18, a walk greensmower 4 is illustrated on trailer 2" in a rear storage position on trailer 2". However, this walk greensmower 4 could have been driven further forwardly and stored in a front storage position on trailer 2". Note that a pair of front wheel locks 48 are also provided for a walk greensmower stored in the front storage position on trailer 2". This would have left enough room on trailer 2" to drive a second walk greensmower up onto trailer 2" and store it in the rear storage position, i.e. the position in which walk greensmower 4 is stored as shown in FIG. 18. The fixed front sections 106 of rails 72 extends sufficiently far forwardly on box 96 of trailer frame 18 to allow transport wheels 12 of both stored walk greensmowers to ride on rails 72 and be retained thereon.

Various modifications of this invention will be apparent to those skilled in the art. Accordingly, the invention is to be limited only by the appended claims.

We claim:

1. A trailer for carrying a walk reel mower from one place to another place, the walk reel mower having a frame, a pair of rotatable transport wheels, a reel type cutting unit carried on a front of the frame, and a handle assembly extending upwardly and rearwardly from the frame to allow an operator to walk behind the mower while the mower is cutting grass, which comprises:

(a) a trailer frame supported for rolling over the ground by a pair of ground engaging trailer wheels, wherein the trailer frame comprises a rearward portion having two parallel, spaced apart wheel ramps located apart a distance equal to the distance between the transport wheels of the walk mower;
   (b) wherein the trailer frame is pivotal between an inclined loading position in which rear ends of the wheel ramps engage against the ground and a substantially horizontal transport position in which the rear ends of the wheel ramps are pivoted up out of engagement with the ground;
   (c) wherein the transport wheels of the walk mower remain on the wheel ramps when the trailer frame is in the transport position; and
   (d) wherein the walk mower can be tipped sufficiently rearwardly on the trailer frame while in the transport position to engage the walk mower against a stop provided on the trailer frame, wherein the stop is positioned on the trailer frame relative to a center of gravity of the walk mower to permit the center of gravity of the walk mower to move rearwardly behind a rotational axis of the transport wheels such that the walk mower is retained by gravity in the rearwardly tipped orientation thereof when the walk mower abuts against the stop, wherein tipping the walk mower rearwardly on the trailer frame until the walk mower abuts the stop permits elevation of the front of the frame of the walk mower for service or adjustment and retains the front of the frame of the walk mower in its elevated position until the walk mower is tipped back forwardly on the trailer frame.

2. The trailer of claim 1, wherein the stop is located between the wheel ramps for engaging against a portion of the walk mower to retain the walk mower in its rearwardly tipped orientation.

3. The trailer of claim 2, wherein the stop comprises a pair of abutment flanges extending inwardly from each wheel ramp towards one another.

4. The trailer of claim 2, wherein the stop comprises a cylindrical member inserted through aligned holes in the wheel ramps to extend between the wheel ramps.

5. A trailer for carrying a walk reel mower from place to place, the walk reel mower having a pair of transport wheels, which comprises:

(a) a trailer frame having a pair of wheel ramps that terminate in free outer ends;
   (b) a pair of ground engaging trailer wheels to permit the trailer frame to roll over the ground;
   (c) a tongue carrying a portion of a tow hitch thereon connected to the trailer frame;
   (d) wherein the trailer frame is pivotal relative to the tongue to permit the trailer frame to pivot between a first loading position in which the free outer ends of the wheel ramps engage the ground to permit the walk mower to be loaded onto the trailer frame by driving or rolling the transport wheels of the walk reel mower up the wheel ramps and a second transport position in which the free outer ends of the wheel ramps are raised out of engagement with the ground and the walk mower is supported by the trailer up out of contact with the ground; and
   (e) wherein each wheel ramp has two sections comprising a first section beginning at the free outer end of the wheel ramp with the first section extending from the free outer end of the wheel ramp to a second section of the ramp, wherein the second section of the ramp forms a seat that receives and supports thereon one of the transport wheels of the walk reel mower when the walk reel mower is loaded onto the trailer, and wherein the first and second sections of the ramps have different inclinations relative to each other and relative to horizontal such that the second sections of the ramps are flatter or less inclined relative to horizontal than the first sections of the ramps when the trailer frame is in the loading position thereof, wherein while the trailer frame remains in the loading position thereof the first sections of the ramps support the walk reel mower in an inclined orientation as the walk reel mower is being loaded and unloaded and the second sections of the ramps support the walk reel mower in a generally horizontal orientation after the walk reel mower has been loaded and the transport wheels of the walk reel mower are seated on the second sections of the ramps.

6. The trailer of claim 5, wherein the wheel ramps are laterally separated from one another by a substantially open and unobstructed space such that the trailer frame lacks a bed or floor between the wheel ramps.

7. The trailer of claim 5, wherein the seats formed by the second sections of the ramps comprise wheel receiving recesses.

8. The trailer of claim 5, wherein each wheel ramp comprises an upwardly facing U-shaped channel having side walls joined to a bottom wall, one of the transport wheels rolling along the bottom wall of the wheel ramp between the side walls of the wheel ramp.

9. The trailer of claim 5, wherein each wheel ramp comprises a rail having a rounded top side, wherein the rounded top side of the rail is sized to be received within a concave groove in an outer rim of one of the transport wheels.

10. A trailer for carrying a walk reel mower from place to place, the walk reel mower having a pair of transport wheels and a reel cutting unit having a front roller that is spaced forwardly of the transport wheels, which comprises:

(a) a trailer frame supported for rolling over the ground by a pair of ground engaging trailer wheels, wherein the trailer frame comprises:
      (i) a transverse crossmember;
      (ii) a pair of parallel wheel ramps, wherein the wheel ramps have front ends fixed to the crossmember with the wheel ramps extending rearwardly from the crossmember to terminate in free outer rear ends spaced behind the crossmember, wherein the wheel ramps are laterally separated from one another by a substantially open and unobstructed space such that the trailer frame lacks a bed or floor between the wheel ramps;
      (iii) a central arm extending forwardly from the crossmember; and
      (iv) a substantially horizontal support on the central arm with the support having portions extending laterally to either side of the central arm, wherein the laterally extending portions of the support are positioned forwardly of the transverse crossmember and of the front ends of the wheel ramps by a distance that is sufficient to encompass the distance by which the front roller is located forwardly of the transport wheels such that the support on the central arm provides a surface that will underlie and support the front roller of the walk reel mower when the transport wheels are located at the front ends of the wheel ramps after the walk reel mower has been loaded onto the trailer frame;

(b) a tongue carrying a portion of a tow hitch thereon connected to the trailer frame; and (c) wherein the trailer frame is pivotal relative to the tongue to permit the trailer frame to pivot between a first loading position in which the free outer rear ends of the wheel ramps engage the ground to permit the walk mower to be loaded onto the trailer frame by driving or rolling the transport wheels of the walk reel mower up the wheel ramps and a second transport position in which the free outer rear ends of the wheel ramps are raised out of engagement with the ground and the walk mower is supported by the trailer up out of contact with the ground.

11. The trailer of claim 10, wherein the laterally extending portions of the support collectively extend across a width that is not as wide as the space between the wheel ramps.

12. The trailer of claim 11, wherein the laterally extending portions of the support comprise a pair of laterally extending pads with one pad located on each aide of the central arm.

13. The trailer of claim 10, further including a forwardly extending handle carried on the central arm to allow an operator to push down or pull up on the central arm of the trailer frame to manually pivot the trailer frame into its transport position or its loading position, respectively.

14. The trailer of claim 13, wherein the handle is inclined upwardly as it extends forwardly.

15. The trailer of claim 13, wherein the handle is carried on the central arm forwardly of the support.

* * * * *